United States Patent
Jeon et al.

(10) Patent No.: US 10,120,532 B2
(45) Date of Patent: Nov. 6, 2018

(54) CONTROL APPARATUS FOR CONTROLLING AN OPERATION OF AT LEAST ONE ELECTRONIC DEVICE

(71) Applicant: Samsung Electronics Co., Ltd., Suwon-si, Gyeonggi-do (KR)

(72) Inventors: Ji Hyun Jeon, Suwon-si (KR); Hye Jung Chang, Seoul (KR); Young Sun Shin, Seongnam-si (KR); Sun Young Seo, Seoul (KR); So Young Yun, Seoul (JP); Ji Yoon Yoon, Seoul (KR); Eun Kyung Hong, Anyang-si (KR); A Ra Cho, Gwangju (KR); Kyung Nam Kim, Goyang-si (KR); Jae Seok Lee, Incheon (KR); Eun Hwa Jang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 15/101,307

(22) PCT Filed: Jan. 6, 2015

(86) PCT No.: PCT/KR2015/000113
§ 371 (c)(1),
(2) Date: Jun. 2, 2016

(87) PCT Pub. No.: WO2015/102471
PCT Pub. Date: Jul. 9, 2015

(65) Prior Publication Data
US 2016/0306509 A1    Oct. 20, 2016

(30) Foreign Application Priority Data

Jan. 6, 2014    (KR) .................. 10-2014-0001553

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 3/048* (2013.01); *G06F 3/0484* (2013.01);
(Continued)

(58) Field of Classification Search
CPC .......... G06F 3/00; G06F 3/048; G06F 3/0481; G06F 3/0482; G06F 3/0484;
(Continued)

(56) References Cited

U.S. PATENT DOCUMENTS 7,173,226 B2 * 2/2007 Kang ..................... H02J 3/14
219/680
9,353,990 B2 * 5/2016 Kim ..................... F25D 29/00
(Continued)

FOREIGN PATENT DOCUMENTS

| KR | 10-2008-0085513 A | 9/2008 |
|---|---|---|
| KR | 10-2012-0072518 A | 7/2012 |
| KR | 10-2013-0017434 A | 2/2013 |

*Primary Examiner* — Xiomar L Bautista
(74) *Attorney, Agent, or Firm* — Jefferson IP Law, LLP

(57) ABSTRACT

According to the present invention, a device for controlling an operation of at least one electric device including a user interface unit having a conversation display window in which a conversation with the at least one electric device is displayed, a conversation input window configured to receive a character for controlling the operation of the at least one electric device, an icon selection window in which an icon corresponding to the at least one electric device is displayed, and a chatting screen on which a send button for transmitting the character received by the conversation input window is arranged, and a control unit configured to collectively control the operation of the at least one electric
(Continued)

device based on a batch control instruction received by the conversation input window.

16 Claims, 36 Drawing Sheets

(51) Int. Cl.
    *H04L 12/28*     (2006.01)
    *G06F 3/0481*     (2013.01)
    *G06F 3/0484*     (2013.01)
    *H04L 12/12*     (2006.01)
    *H04L 12/58*     (2006.01)

(52) U.S. Cl.
    CPC .......... *G06F 3/04817* (2013.01); *H04L 12/12* (2013.01); *H04L 12/282* (2013.01); *H04L 12/2816* (2013.01); *H04L 51/18* (2013.01); *H04L 51/04* (2013.01)

(58) Field of Classification Search
    CPC ..... G06F 3/04817; G06F 15/16; G05B 15/02; G05B 23/02; H04L 12/12; H04L 12/28; H04L 12/2816; H04N 5/44; H04W 4/12; H04W 4/14
    See application file for complete search history.

(56) References Cited

U.S. PATENT DOCUMENTS

| | | | |
|---|---|---|---|
| 2002/0188663 A1* | 12/2002 | Islam | H04L 29/06 709/202 |
| 2004/0148632 A1* | 7/2004 | Park | H04N 5/44582 725/81 |
| 2005/0105759 A1* | 5/2005 | Roberts | G06F 3/017 382/100 |
| 2006/0036970 A1* | 2/2006 | Rich | G06F 3/04895 715/821 |
| 2007/0005822 A1* | 1/2007 | Yamamoto | H04L 12/2803 710/15 |
| 2007/0197236 A1 | 8/2007 | Ahn et al. | |
| 2008/0233983 A1 | 9/2008 | Park et al. | |
| 2010/0200565 A1* | 8/2010 | Leung | H05B 3/68 219/443.1 |
| 2011/0187928 A1 | 8/2011 | Crabtree | |
| 2012/0316984 A1* | 12/2012 | Glassman | G06Q 10/06 705/26.7 |
| 2013/0041951 A1 | 2/2013 | Lee et al. | |
| 2014/0207707 A1* | 7/2014 | Na | H04L 12/2818 705/412 |
| 2014/0218517 A1* | 8/2014 | Kim | H04L 12/2818 348/143 |
| 2015/0006296 A1* | 1/2015 | Gupta | G06Q 30/0269 705/14.66 |
| 2015/0253364 A1* | 9/2015 | Hieda | H04Q 9/00 702/62 |

* cited by examiner

FIG. 25

CONTROL APPARATUS FOR CONTROLLING AN OPERATION OF AT LEAST ONE ELECTRONIC DEVICE

TECHNICAL FIELD

The present invention relates to a control device for monitoring and controlling home appliances.

BACKGROUND ART

Recently, along with the rapid development of wired/wireless data communication technology and the broad distribution of communication networks, high-speed communication services such as the Internet have been widely popularized. In particular, as high-speed Internet service has been provided in households, conventional PC-based network technology has developed into home network technology for remotely controlling digital home appliances.

A home network system is a system for connecting digital home appliances, sensors, light fixtures, heating and cooling devices, gas devices, and so on over a wired or wireless local area network to control appliances desired by a user anywhere at any time.

Such a home network system typically includes a home server (or a home monitoring gateway) that functions as a master, a plurality of home network devices (hereinafter referred to as control target devices) that are monitored and controlled by the home server, and a controller that locally or remotely monitors and controls a plurality of control target devices through a connection with only the home server.

In this case, the home server is generally implemented on a residential gateway (RG) or a wall pad, and a controller is generally implemented in a wall pad, a TV, a cell phone, a computer, etc. The home server and the controller may be integrated and implemented as one device. For example, a TV may serve as the control device in addition to the home server.

In the home network system, the home server may automatically recognize control target devices, for example, a TV, a refrigerator, a lamp, a microwave, a sensor, a boiler, and a washing machine, which are connected to a home network through various physical media (e.g., a power line, a serial communication such as RS-232, Ethernet, etc.), and may display the recognized home network devices on a screen to control devices desired to be controlled by a user.

The controller monitors and controls a plurality of control target devices through communication with the home server.

In the home network system, the home server transmits data to or receives data from an external network, which is mainly implemented as an Internet network.

The user uses a control device such as a PC, a notebook, a smartphone, a tablet PC, a TV, a wearable device, and various remote controllers to access the home server located inside or outside the home and then access a plurality of home appliances connected to the home network inside the home.

In addition, when a plurality of electric devices are registered with an external server, the user accesses the plurality of electric devices registered with the external server via the external server, irrespective of the home server.

When the user uses the control device to monitor and control the control target devices inside the home, the use should select one of the control target devices, access the selected control target device over a network, perform authentication, and then monitor or control the control target device. Thus, it is difficult for the user to use the control device.

For example, home appliances such as an air conditioner or air cleaner for conditioning an air and a humidifier for adjusting humidity are usually controlled together. In this case, the user should inconveniently and inefficiently issue an operation control command to each electric device.

DISCLOSURE

Technical Problem

One aspect provides a control device configured to input a predetermined instruction to a chatting screen to collectively control or individually control the operation of a plurality of electric devices, and a control method thereof.

Another aspect provides a control device configured to perform an instruction auto-complete function, a recommended instruction provision function, a similar instruction provision function, and an icon instruction provision function when an instruction is input to the chatting screen, and a control method thereof.

Still another aspect provides a control device having a notification window for informing of an operation event of an electric device and configured to display a chatting unit screen for chatting with the electric device when the notification window is touched as an input, and a control method thereof.

Yet another aspect provides a control device including an overview unit having an icon of a home electric device, a speech bubble configured to display an operation state of the home electric device, and a movement button for laterally moving a screen on which an icon is displayed when an app for a home network is executed, and a control method thereof.

Yet another aspect provides a control device including a master key having a plurality of buttons for integrally controlling home electric devices on the basis of a predetermined operation command when an app for a home network is executed, and a control method thereof.

Yet another aspect provides a control device including a chatting unit configured to chat with a home electric device using a shortcut button for which a chatting word is predetermined when an app for a home network is executed, and a control method thereof.

Technical Solution

In accordance with an aspect, a control device for controlling an operation of at least one electric device, the control device including: a user interface unit configured to have a chatting screen, the chatting screen comprising a conversation display window for displaying a conversation with the at least one electric device, a conversation input window for receiving a character for controlling an operation of the at least one electric device, an icon selection window for displaying an icon corresponding to the at least one electric device, and a send button for sending the character received through the conversation input window; and a control unit configured to collectively control the operation of the at least one electric device based on a batch control instruction received by the conversation input window.

The control device further includes a storage unit configured to store a batch control instruction for simultaneously controlling at least two or more electric devices. When the input character is the batch control instruction, the control unit simultaneously controls the at least two or more electric devices.

When the input character is the batch control instruction, the control unit performs control such that an icon for all devices is displayed in the icon selection window.

The control device further includes a storage unit configured to store a control instruction for individually controlling any one electric device. When the received character is the control instruction for individually controlling any one electronic device, the control unit checks an electric device corresponding to the control instruction, controls an operation of the checked electric device corresponding to the control instruction, and performs control to display an icon of the checked electric device in the icon selection window.

When the input character is the individual control instruction, the control unit checks the electric device having the individual control instruction and performs control such that an icon of the checked electric device is displayed in the icon selection window.

When two or more electric devices correspond to the control instruction for individually controlling any one electronic device, the control unit performs control to display a list of the two or more electric devices. When any one electric device is selected, the control unit controls an operation of the selected electric device based on the control instruction.

When the two or more electric devices correspond to the control instruction for individually controlling any one electronic device, the control unit performs control to display an icon for all electric devices in the icon selection window.

The control unit checks whether the character received by the conversation input window is a device name, checks an electric device having the device name when the character received by the conversation input window is the device name, and performs control such that an icon of the checked electric device is displayed in the icon selection window.

When the device name and the character are received by the conversation input window and then the send button is input, the control unit checks whether the input character is a shortcut letter, checks an instruction corresponding to the input character when the input character is the shortcut letter, and controls an operation of the checked electric device based on the checked instruction.

When the device name and the character are received by the conversation input window and then the send button is input, the control unit checks whether the input character is an instruction, checks an instruction having a similarity equal to or greater than a certain value with the input character when the input character is not the instruction, and performs control to display the checked instruction.

When the device name and the character are received by the conversation input window, the control unit checks an instruction having the input character as a first character and performs control to display the checked instruction.

The control unit checks an electric device having an icon selected on the icon selection window, checks an operation state of the checked electric device, and performs control to display a list of executable recommended instructions based on the checked operation state.

The control unit checks an electric device having the device name received by the conversation input window, checks an operation state of the checked electric device, and performs control to display a list of executable recommended instructions based on the checked operation state.

The control unit checks an electric device having the device name received by the conversation input window and performs control to display a list of instructions for controlling the checked electric device.

In accordance with another aspect, a device for controlling an operation of at least one electric device includes a user interface unit having a conversation display window in which a conversation with the at least one electric device is displayed, a conversation input window configured to receive a character for controlling the operation of the at least one electric device, an icon selection window in which an icon corresponding to the at least one electric device is displayed, and a chatting screen on which a send button for transmitting the character received by the conversation input window is arranged; and a control unit configured to check an instruction corresponding to the character received by the conversation input window and control the operation of the at least one electric device based on the checked instruction.

When a device name and the character are received by the conversation input window and then the send button is input, the control unit checks whether the input character is a shortcut letter and checks an instruction corresponding to the input character when the input character is the shortcut letter.

When a device name and the character are received by the conversation input window and then the send button is input, the control unit checks whether the input character is an instruction, checks an instruction having a similarity equal to or greater than a certain value with the input character when the input character is not the instruction, and performs control to display the checked instruction.

When a device name and the character are received by the conversation input window, the control unit checks an instruction having the input character as a first character and performs control to display the checked instruction.

The control unit checks an electric device having an icon selected on the icon selection window, checks an operation state of the checked electric device, and performs control to display a list of executable recommended instructions based on the checked operation state.

The control unit checks an electric device having a device name received by the conversation input window, checks an operation state of the checked electric device, and performs control to display a list of executable recommended instructions based on the checked operation state.

The control unit checks an electric device having a device name received by the conversation input window and performs control to display a list of instructions for controlling the checked electric device.

Advantageous Effects

According to an aspect, it is possible to easily control an operation of a plurality of electric devices by inputting a predetermined instruction to a chatting screen to collectively control or individually control the operation of the plurality of electric device.

It is also possible to easily input an instruction by providing an instruction auto-complete function, a recommended instruction, a similar instruction, and an icon instruction when an instruction is input to the chatting screen.

It is possible to allow an operation state of an electric device to be easily checked by displaying a notification window for informing of an operation event of an electric device in a quick panel window of the home screen even when an app is not executed in the user interface unit.

In addition, it is possible to easily access a chatting screen, a control screen, and a service screen by touching a notification window in the quick panel window as an input.

It is also possible to easily and quickly check an operation state of an electric device since the operation state of the electric device is displayed through a pop-up window even when an app is not executed in the user interface unit.

It is also possible to facilitate identification by displaying each of a plurality of home electric appliances and easily check an operation state of the home electric appliance by displaying an operation state of the electric device in the vicinity of the icon as a speech bubble. That is, it is possible to provide convenience to the user.

In addition, since the operation state of the electric device may be changed only by touching an icon, it is possible to easily control the operation of the electric device and integrally control electric devices at the same time using the plurality of buttons of the master key, thus enhancing convenience and efficiency of control of the electric device. It is also possible to rapidly and easily check the state information of the electric device by utilizing a pop-up window to output an event in which the state of the electric device is changed.

Furthermore, it is also possible to simply and easily transmit an operation command to at least one electric device using a shortcut button of the chatting unit.

DESCRIPTION OF DRAWINGS

FIGS. 25 to 27 are exemplary diagrams showing the display of a conversation partner of the chatting screen of the user interface unit provided in a control device according to another embodiment.

MODES OF THE INVENTION

Hereinafter, embodiments of the present invention will be described in detail with reference to the accompanying drawings.

Figure 1:
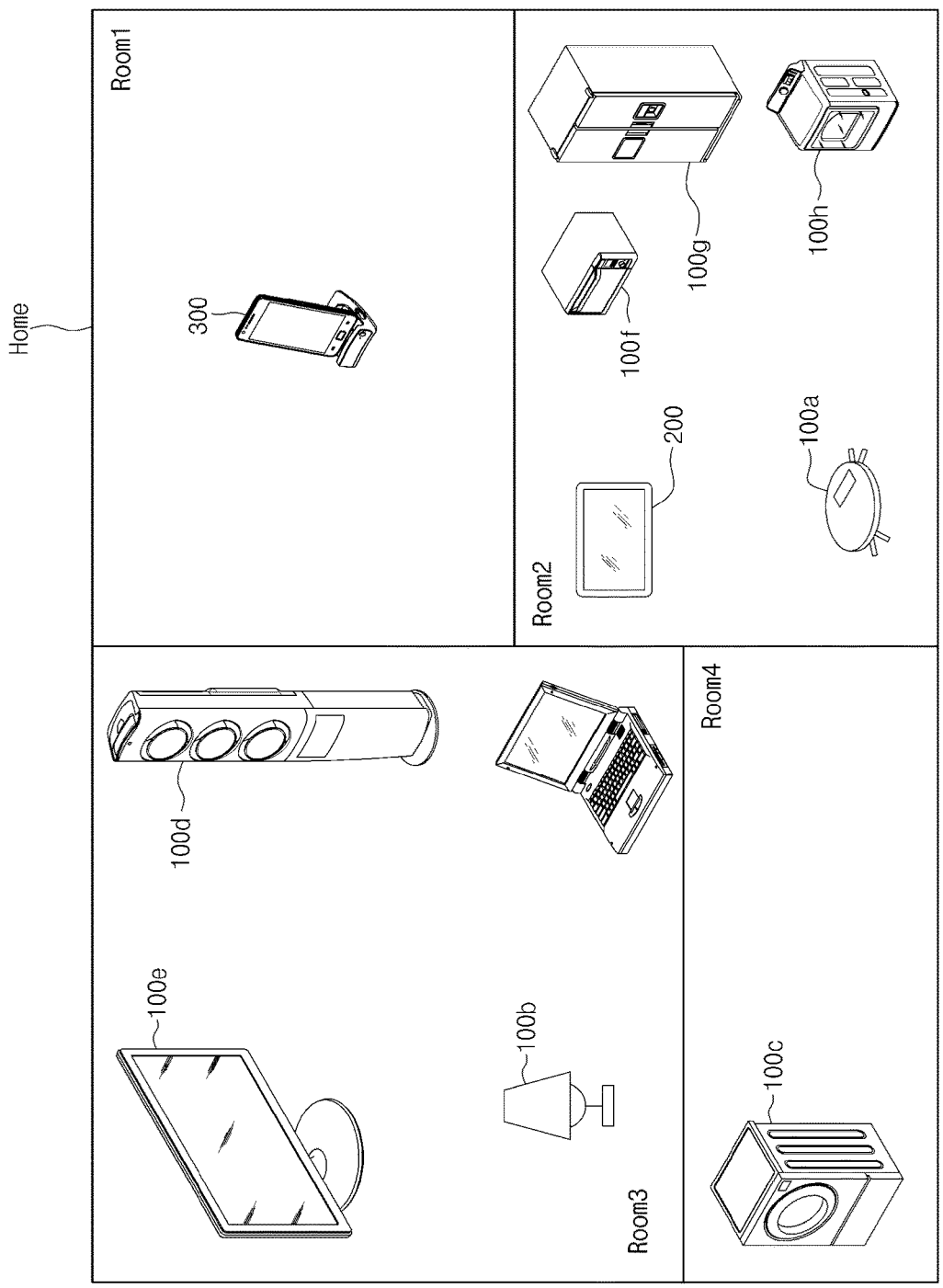
FIG. 1 is an exemplary diagram showing a home network system that communicates with a control device according to an embodiment.
Figure 2:
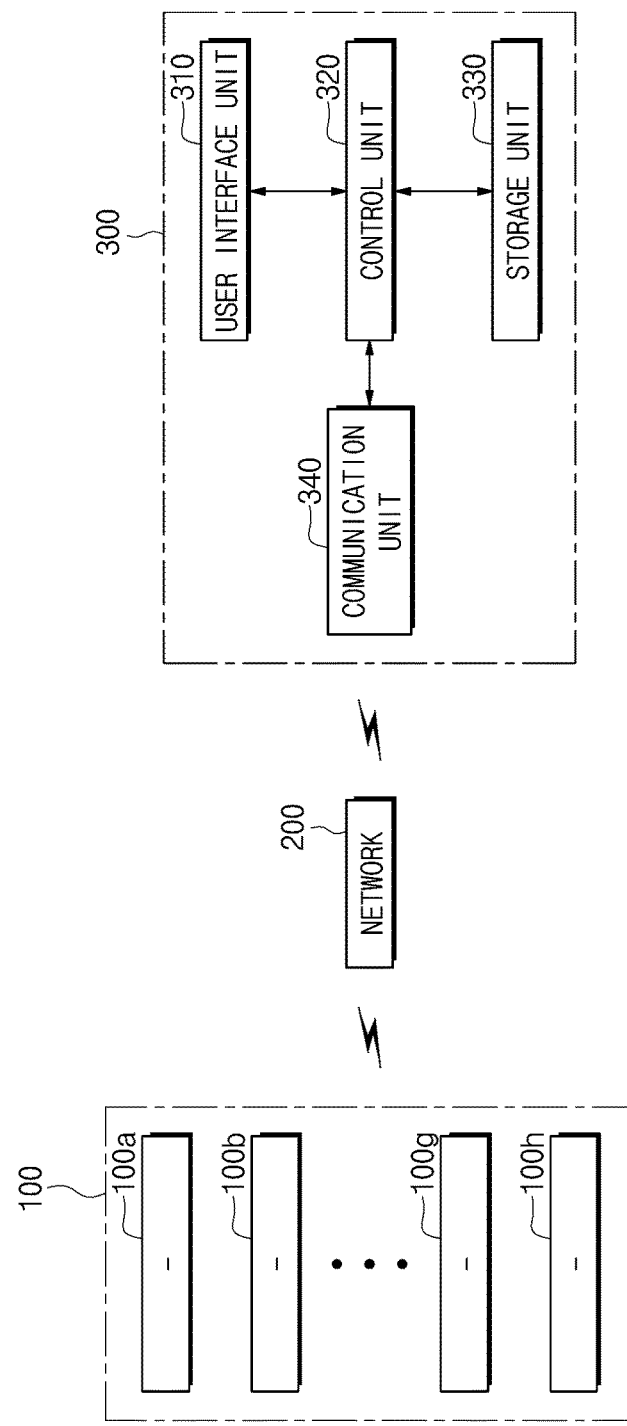
FIG. 2 is a block diagram showing a home network system that communicates with a control device according to an embodiment.

FIG. 1 is an exemplary diagram showing a home network system that communicates with a control device according to an embodiment, and FIG. 2 is a block diagram showing a home network system that communicates with a control device according to an embodiment. The home network system that communicates with the control device includes a plurality of electric devices 100a to 100h and a network.

The electric devices 100a to 110h, each of which is a device that performs a predetermined unique function, transmit operation information corresponding to an operation state by performing an additional function of communicating with the control device over the network, and perform an operation corresponding to an operation command transmitted by the control device. Here, the control device 300 includes a mobile device.

The electric devices include home appliances that are not portable, such as a robot cleaner 100a, a light fixture 100b, a washing machine 100c, an air conditioner 100d, a television 100e, a cooking appliance 100f, a refrigerator 100g, and a dishwasher 100h, and may further include a terminal that is used in the home, such as a notebook, a PC, and a tablet. In addition, the electric devices may further include a security device in which a camera and a microphone are provided.

A network 200 is a home network that enables bidirectional communication by connecting all electric or electronic devices used in the home to one system.

In detail, the network 200 may allow information to be shared between the plurality of electric devices and the control device 300 over the wired/wireless Internet.

Home information transfer methods may be classified into a wired scheme and a wireless scheme. Examples of the wired scheme include a home phoneline networking alliance (PNA) using an existing telephone line, IEEE 1394, a power line, etc. Examples of the wireless scheme include home radio frequency (RF), Bluetooth, Infrared Data Association (IrDA) and wireless LAN (e.g., WiFi), Zigbee, Z-wave, and a short-range communication (e.g., NFC, etc.).

The network 200 includes a home server that manages and controls the plurality of electric devices.

The home server may be implemented on a residential gateway (RG), a wall pad, or a TV.

The home server may be implemented in software and provided in various electric devices or various mobile devices in the home. In addition the home server may be implemented in hardware and combined with various electric devices or various mobile devices in the home.

That is, the home server displays operation states of the plurality of electric devices in the home, receives an operation command for at least one of the plurality of electric devices from a user, and then transmits the operation command to the at least one electric device.

The control device 300 communicates with at least one of the plurality of electric devices through wired or wireless communication.

In addition, the control device 300 may communicate with each of the plurality of electric devices in the home, and may transmit or receive information of the plurality of electric devices through communication with the home server.

The control device 300 includes an app for communicating with the home network to monitor and control the plurality of electric devices in the home. When the app is executed by the user, the control device 300 outputs an operation state of at least one of the plurality of electric devices in the home, receives an operation command from the user, and controls an operation of the at least one electric device on the basis of the received operation command.

The control device 300, which is a terminal device movable to the outside of the home such as a smartphone, a tablet PC, a notebook, etc., or a device fixed inside the home such as a TV, various remote controllers, etc., may be a terminal device in which an app provided by a content provider may be installed, and may be a device having an app, software, or firmware built therein when the device is manufactured by a manufacturer.

As shown in FIG. 2, the control device 300 includes a user interface unit 310, a control unit 320, a storage unit 330, and a communication unit 340.

The user interface unit 310 outputs operation states of pre-registered electric devices among the plurality electric devices disposed in the home and receives an operation command for at least one of the pre-registered electric devices.

The user interface unit 310 includes a display unit for displaying the operation states of the pre-registered electric devices and an input unit for receiving the operation command from the user.

Here, the input unit is a touch panel for receiving an operation command, and the user interface unit 310 may be implemented as a touch screen in which a display panel of the display unit and the touch panel of the input unit are integrally formed.

In addition, the input may be received by the input unit through an electronic pen, a pointing device (mouse, etc.), and a keyboard in addition to the touch panel. In this case, the input unit may be formed separately from the display panel of the display unit. However, when the input unit is a touch type electronic pen, the input unit may be formed integrally therewith.

The user interface unit 310 includes a home screen on which icons for various apps are displayed.

The user interface unit 310 displays an icon of an app for monitoring and controlling an electric device on the home screen, transmits an app selection signal to the control unit 320 when the icon of the app is selected by the user, and displays a screen corresponding to execution of the app on the basis of a command of the control unit 320. The screen display configuration of the user interface unit will be described below.

When the app is executed, the control unit 320 controls the user interface unit 310 such that operation states of pre-registered electric devices are output, and controls transmission of a signal corresponding to an operation command for at least one electric device on the basis of an operation command input to the user interface unit 310.

The control configuration of the control unit 320 will be described below in association with the screen display configuration of the user interface unit.

The storage unit 330 stores identification information of home electric devices registered by the user and an app for monitoring and controlling the pre-registered electric devices.

The storage unit 330 stores an operation command for a pre-registered electric device for each button of a master key and stores an operation command for an electric device for each shortcut button of a chatting unit.

The communication unit 340 communicates with the pre-registered electric devices.

Furthermore, the communication unit 340 may also communicate with the home server.

The user interface unit 310 will be described in detail with reference to FIGS. 3 to 20. In addition, a control operation of the control unit 320 will also be described.

Figure 3:
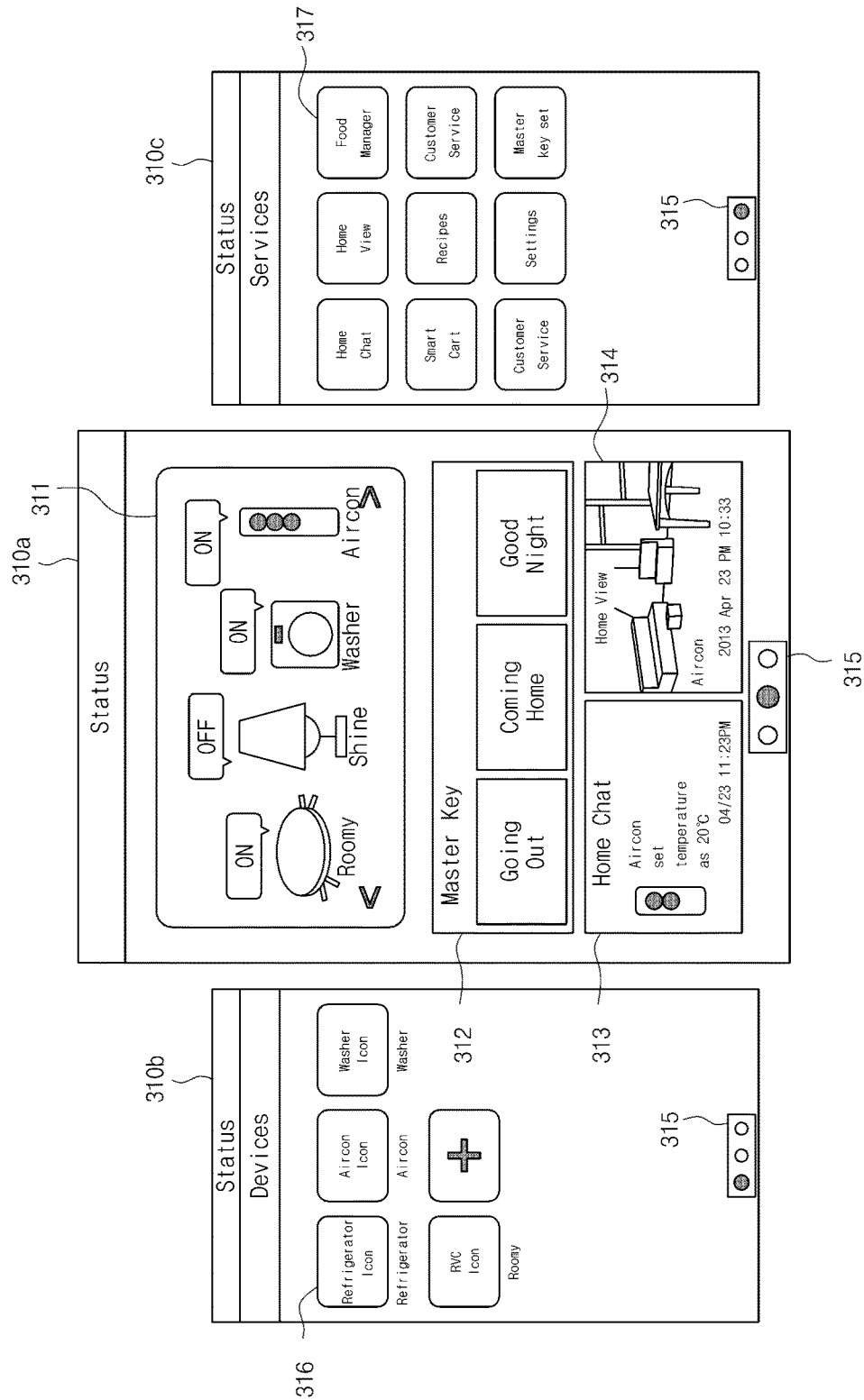
FIG. 3 is an exemplary diagram showing a dashboard screen and a plug-in screen of a control device according to an embodiment.

FIG. 3 is an exemplary diagram showing a dashboard screen and a plug-in screen of a control device according to an embodiment.

When the app is executed, the user interface unit 310 displays a dashboard screen 310a as an initial screen.

Here, the dashboard screen 310a is a screen on which basic information regarding a plurality of electric devices connected through the home network, information for controlling an operation, and so on are displayed.

When a sliding touch is input to the dashboard screen 310a, the user interface unit 310 switches the screen from the dashboard screen 310a to a plug-in screen 310b or 310c.

That is, when a sliding touch applied from left to right is input to the dashboard screen 310a, the user interface unit 310 displays a first plug-in screen 310b on which a device registration item for registering an electric device is displayed. When a sliding touch applied from right to left is input to the dashboard screen 310a, the user interface unit 310 displays a second plug-in screen 310c on which a service item for servicing and setting the electric device is displayed.

In addition, when a sliding touch applied from right to left is input while the first plug-in screen 310b is displayed, the user interface unit 310 displays the dashboard screen 310a.

According to the embodiment, the number of plug-in screens is two, but may be one or three or more.

The control unit 320 checks a screen being displayed, performs switching control such that a screen positioned at the right side of the current screen is displayed when the sliding touch applied from right to left is input, and performs switching control such that a screen positioned at the left side of the current screen is displayed when the sliding touch applied from left to right is input.

For example, when a sliding touch is input while the dashboard screen 310a is displayed, the control unit 320 checks a sliding touch direction. The control unit 320 controls switching to the first plug-in screen 310b when the checked sliding touch direction is from left to right, and controls switching to the second plug-in screen 310c when the checked sliding touch direction is from right to left.

The dashboard screen 310a includes an overview unit 311 for displaying list information and operation information of pre-registered electric devices and widget units 312, 313, and 314 for displaying execution command information and monitoring information for rapidly and easily controlling operations of the pre-registered electric devices.

In addition, the dashboard screen 310a further include a screen switching unit 315 configured to directly switch from the dashboard screen to the plug-in screen, directly switch from the plug-in screen to the dashboard screen, or directly switch from one plug-in screen to another plug-in screen.

The term "direct switching" includes switching the screen through a single touch rather than the sliding touch.

That is, the screen switching unit 315 includes page buttons equal in number to the plurality of screens. The arrangement of the plurality of page buttons corresponds to that of the plurality of screens. A page button corresponding to the position of the currently displayed screen is displayed differently from the remaining page buttons. Thus, the user may recognize the position of the currently displayed screen.

In addition, arrangement information of the plurality of screens may be preset, and the arrangement of the screens may be changed by the user.

For example, the user interface unit according to the embodiment includes a total of three screens, that is, the dashboard screen, the first plug-in screen, and the second plug-in screen. For the arrangement of the three screens, the first plug-in screen is disposed at the left side of the dashboard screen, and the second plug-in screen is disposed at the right side of the dashboard screen.

Thus, there are a total of three page buttons of the screen switching unit 315. Among the three page buttons, a left page button is linked with the first plug-in screen 310b, a center page button is linked with the dashboard screen 310a, and a right page button is linked with the second plug-in screen 310c.

When the left page button is touched, the first plug-in screen 310b is displayed on the user interface unit. In this case, the left page button has a different color from other buttons.

When the center page button is touched, the dashboard screen 310a is displayed on the user interface unit. In this case, the center page button has a different color from other buttons.

When the right page button is touched, the second plug-in screen 310c is displayed on the user interface unit. In this case, the right page button has a different color from other buttons.

That is, the control unit 320 performs control to check the page button touched among the plurality of page buttons of the screen switching unit 315, check a screen corresponding to the checked page button, and display the checked screen on the user interface unit 310.

The first plug-in screen 310b and the second plug-in screen 310c are each a screen for changing setting information of a main function, setting an additional function, or receiving a service.

In detail, the first plug-in screen 310b includes a device check button having registration information regarding a pre-registered electric device and a registration setting button 316 for registering a new device.

The second plug-in screen 310c includes a setting change button for changing settings of a master key, a chatting unit, and a home view unit of a widget unit, a service button for receiving a service for the pre-registered electric device, and a management button 317 for each pre-registered electric device.

Figure 4:
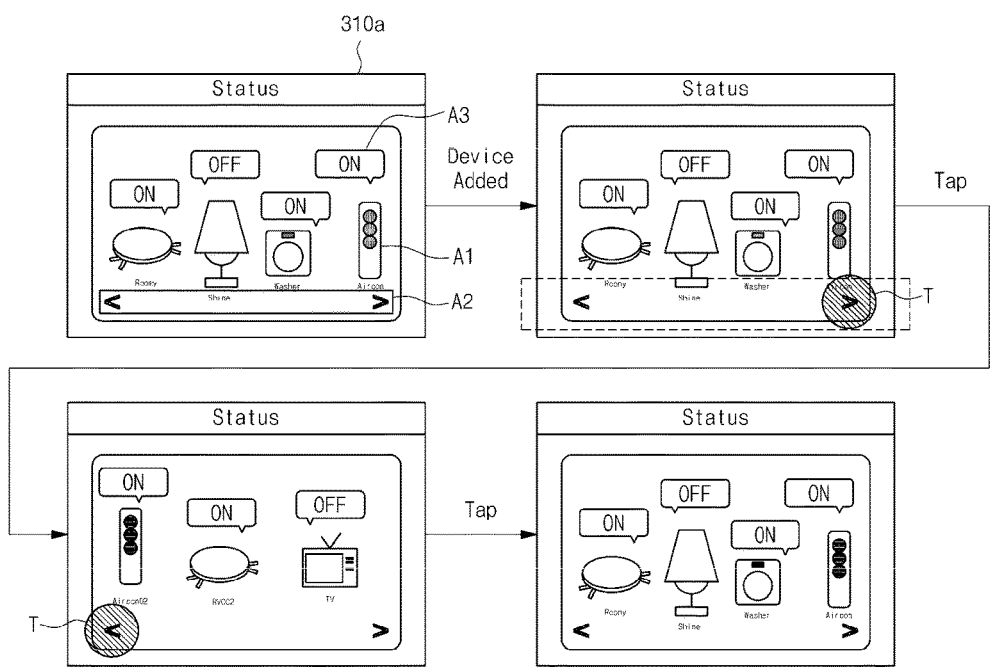
FIGS. 4 to 6 are exemplary diagrams showing an execution of an overview unit in the dashboard screen of a control device according to an embodiment.
Figure 5:
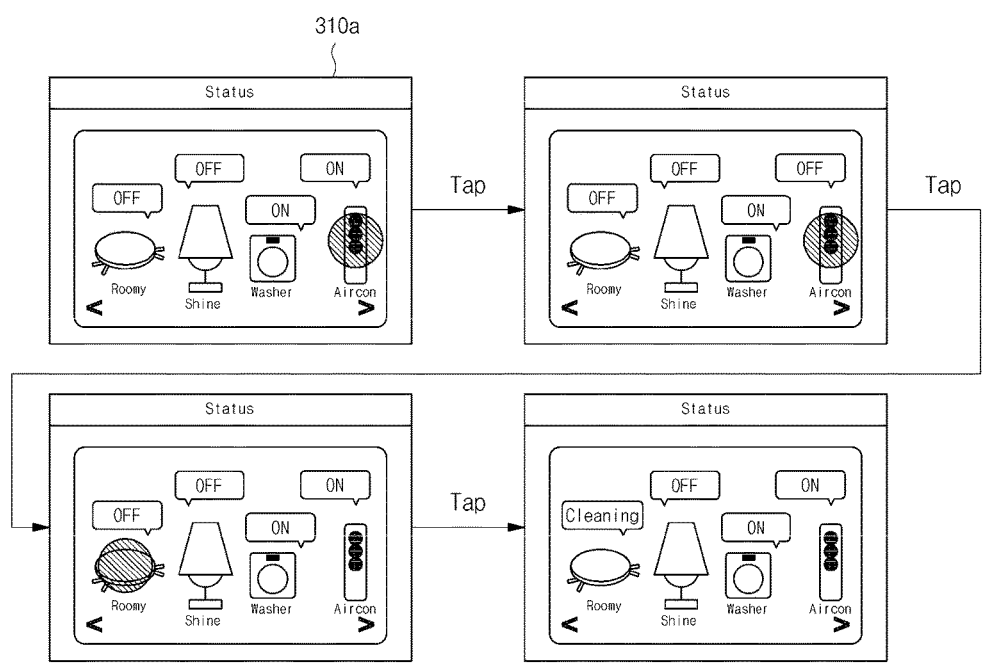
Figure 6:
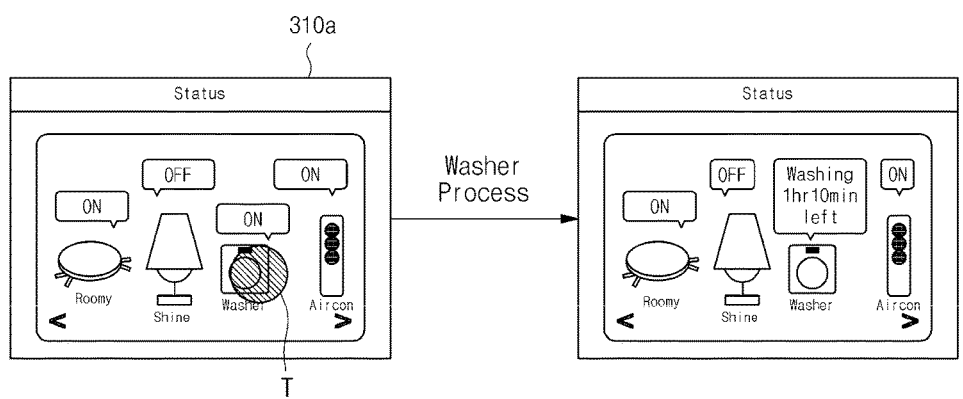

FIGS. 4 to 6 are exemplary diagrams showing an execution of an overview unit in a dashboard screen of a control device according to an embodiment. The overview unit 311 will be described in detail with reference to FIGS. 4 to 6.

As shown in FIG. 4, the overview unit 311 displays a list of pre-registered electric devices and displays icons A1 of the pre-registered electric devices.

In addition, the overview unit 311 further includes a movement button A2 for moving a screen on which the icons of the pre-registered electric devices are arranged.

That is, the movement button A2 is a button for moving the currently displayed icon to change a display position of the icon in order to display icons of the remaining electric devices that are hidden and not displayed on one screen in the overview unit.

In this case, the movement button A2 is in a hidden state when the number of icons of the pre-registered electric devices is less than a predetermined number of icons that can be displayed on one screen. The movement button A2 is in a displayed state when the number of icons of the pre-registered electric devices is greater than the predetermined number of icons that can be displayed on one screen.

The movement button A2 includes a first direction button < that instructs to move from a currently displayed screen to a screen extending in a first direction, and a second direction button > that instructs to move from the current displayed screen to a screen extending in a second direction. Here, the second direction is a direction opposite to the first direction.

When the first direction button < is selected, the overview unit 311 shifts icons of a predetermined number of electric devices in the current screen by one column in the second direction to rearrange the icons. When the second direction button > is selected, the overview unit 311 shifts icons of a predetermined number of electric devices in the current screen by one column in the first direction to rearrange the icons.

In this case, when the first direction button < is selected, the overview unit 311 rearranges an icon of a new electric device at the leftmost column of the screen and removes an icon of an electric device that has been positioned at the rightmost column. When the second direction button > is selected, the overview unit 311 rearranges an icon of a new electric device at the rightmost column and removes an icon of an electric device that has been positioned at the leftmost column.

In addition, when the first direction button < is selected, the overview unit 311 displays a screen positioned at the left side of the current screen and displays an icon of an electric device arranged on the left screen. When the second direction button > is selected, the overview unit 311 displays the screen positioned at the right side of the current screen and displays an icon of an electric device arranged on the right screen.

As shown in FIG. 4, when the second direction button > is touched while icons of a cleaner, a light fixture, a washing machine, and an air conditioner are arranged on the current screen of the overview unit 311, icons of an air conditioner2, a robot cleaner2, and a television positioned on the right screen of the current screen are displayed.

When the first direction button < is touched while the icons of the air conditioner2, the robot cleaner2, and the television are displayed, the overview unit 311 moves the currently displayed screen to the left screen and displays the icons of the cleaner, the light fixture, the washing machine, and the air conditioner positioned on the left screen again.

Although the movement button of the overview unit 311 is touched, the control unit 320 controls the user interface unit 310 such that screens of the widget units 312, 313, and 314 are maintained in the current state.

In addition, the overview unit 311 further includes a speech bubble A3 that informs about an on/off state or a progressive state, which indicates a current operation state, of a pre-registered electric device. The speech bubble A3 is positioned in the vicinity of the icon A1 such that the speech bubble A3 is easily recognized by the user.

The speech bubble A3 changes a notification indicating an operation state of an electric device on the basis of a command of the control unit 320.

That is, when any one of the icons displayed in the overview unit 311 is touched, the control unit 320 changes the operation state of the electric device corresponding to the touched icon and controls the user interface unit 310 such that the changed operation state is displayed in a speech bubble.

For example, when the icon of the air conditioner is touched while the air conditioner is in an on state, the control unit 320 controls the air conditioner to be powered off and controls the user interface unit 310 such that the off state of the air conditioner is displayed in the speech bubble. When the icon of the air conditioner is touched while the air conditioner is in an off state, the control unit 320 controls the air conditioner to be powered on and controls the user interface unit 310 such that the on state of the air conditioner is displayed in the speech bubble.

As shown in FIG. 5, on a condition that the icons of the robot cleaner, the light fixture, the washing machine, and the air conditioner are displayed, the overview unit 311 utilizes the speech bubble to inform that the operation of the air conditioner is powered off when the icon of the air conditioner that is powered on is touched, and utilizes the speech bubble to inform that the operation of the robot cleaner is cleaning when the icon of the robot cleaner that is power off is touched.

In addition, when the icon of a washing machine is touched while the washing machine is in an on state, the control unit 320 checks a work-in-progress state of the washing machine and controls the user interface unit 310 such that the checked work-in-progress state of the washing machine is displayed in the speech bubble.

As shown in FIG. 6, when an icon of the washing machine in an on state is touched while the icons of the robot cleaner, the light fixture, the washing machine, and the air conditioner are displayed, the overview unit 311 utilizes the speech bubble to inform that a progress state of the washing machine is "one hour and ten minutes have passed."

In addition, the control unit 320 may check at least one of an update state, an error state, and a reservation state of the pre-registered electric device, and may control the user interface unit such that the checked state information is displayed in the speech bubble.

That is, the speech bubble A3 informs about any one of the update information, the error information, and the reservation information of the electric device.

In addition, when an operation state of at least one electric device is changed in response to a touch input to a master key 312 of the widget unit and a chatting instruction input of a chatting unit 313, the control unit 320 controls the user interface unit 310 such that the changed operation state is displayed in a speech bubble.

The widget unit of the user interface unit 310 includes the master key 312 for operating a pre-registered electric device on the basis of a preset operation command, the chatting unit 313 for chatting with at least one of pre-registered electric devices, and a home view unit 314 that outputs a home interior image. This will be described with reference to FIGS. 7 and 8.

Figure 7:
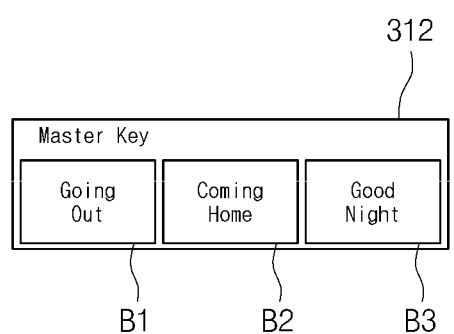
FIG. 7 is an exemplary diagram showing a master key in the dashboard screen of a control device according to an embodiment.

FIG. 7 is an exemplary diagram showing a master key in a dashboard screen of a control device according to an embodiment.

The master key 312 includes a button for integrally controlling operations of a plurality of electric devices. This button previously includes an operation command for each electric device.

The button of the master key 312 may be set on the basis of a user's schedule.

As shown in FIG. 7, the master key 312 includes a going-out button B1, a coming-home button B2, and a good-night button B3.

When the master key 312 of the user interface unit is touched, the control unit 320 checks the touched button to transmit a preset operation command for each electric device corresponding to the checked button to the pre-registered electric device, thus allowing the pre-registered electric device to operate on the basis of the preset operation command. In this case, the user interface unit 310 informs about the operation state of the pre-registered electric device through a speech bubble.

A button for integrally controlling the master key 312 may be additionally added. The addition may be performed through a "master key setting button" of the second plug-in screen.

In addition, the "master key setting button" may be arranged in the master key.

In addition, an operation command for an electric device for each button of the master key 312 may be changed. This change may also be performed through the "master key setting button" of the second plug-in screen.

In addition, the button in which the master key 312 is set may be deleted. This deletion may also be performed through the "master key setting button" of the second plug-in screen.

Figure 8:
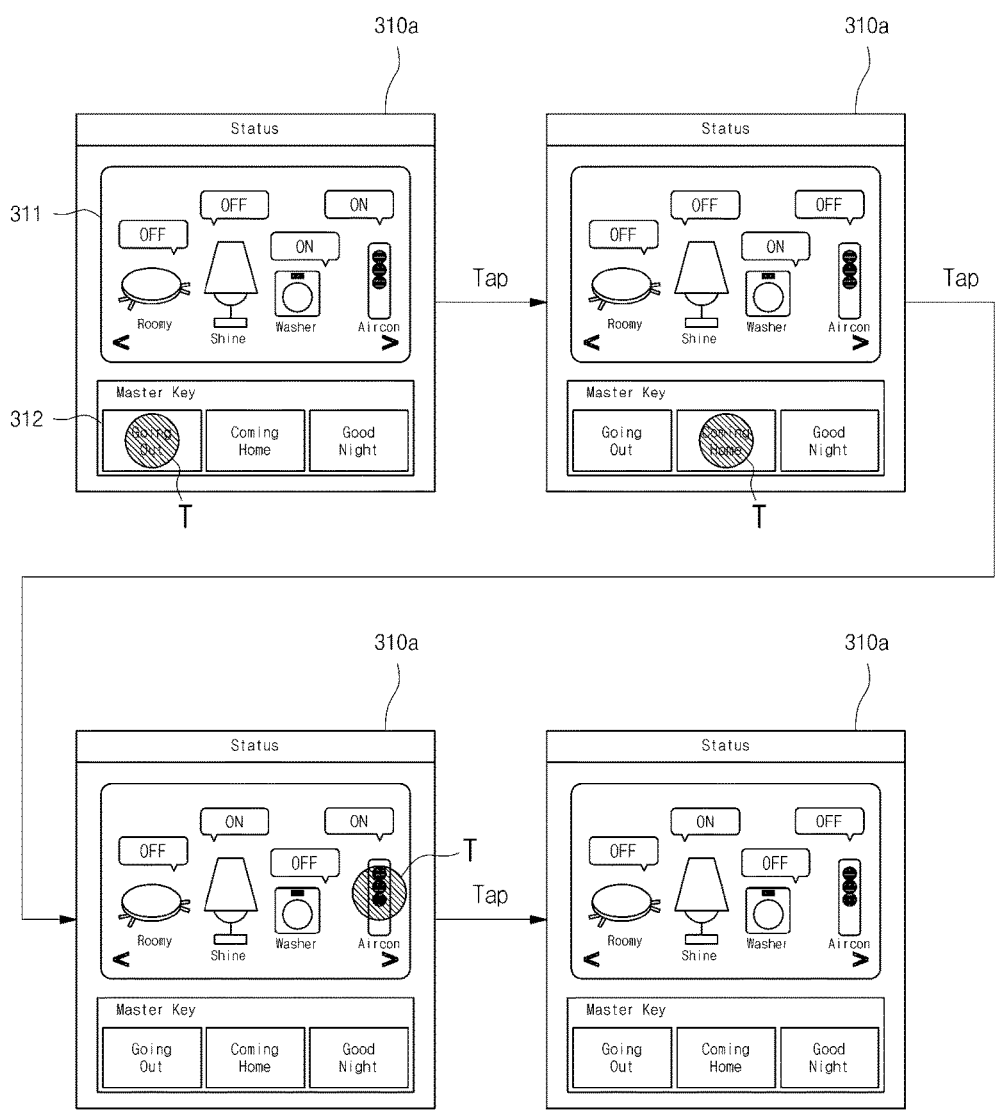
FIG. 8 is an exemplary diagram showing an execution of the master key in the dashboard screen of a control device according to an embodiment.

FIG. 8 is an exemplary diagram showing an execution of a master key in a dashboard screen of a control device according to an embodiment.

As shown in FIG. 8, the overview unit 311 displays icons of a robot cleaner, a light fixture, a washing machine, and an air conditioner and displays a speech bubble that informs about an operation state of each electric device in the vicinity of each of the icons.

It is assumed that the operation command for each electric device corresponding to the going-out button includes powering off the light fixture and powering off the air conditioner, and the operation command for each electric device corresponding to the coming-home button includes powering on the light fixture and powering on the air conditioner.

When the going-out button B1 of the master key 312 is touched (T) while an operation state of the robot cleaner is off, an operation state of the light fixture is off, an operation state of the washing machine is on, and an operation state of the air conditioner is on, the user interface unit 310 maintains the operation states of the robot cleaner and the light fixture in the off state, maintains the operation state of the washing machine in the on state in order to prevent the washing machine from stopping while working, powers off the operation state of the air conditioner, and informs about the operation state of each electric device through a speech bubble.

When the coming-home button B2 of the master key 312 is touched (T) while the operation state of the robot cleaner is off, the operation state of the light fixture is off, the operation state of the washing machine is off, and the operation state of the air conditioner is off, the user interface unit 310 maintains the operation states of the robot cleaner and the washing machine in the off state, powers on the lighting device and the air conditioner, and informs about the operation state of each electric device through a speech bubble. In this case, when a user touches (T) the icon of the air conditioner, the user interface unit 310 powers off the air conditioner and informs about the power-off through a speech bubble.

Figure 9:
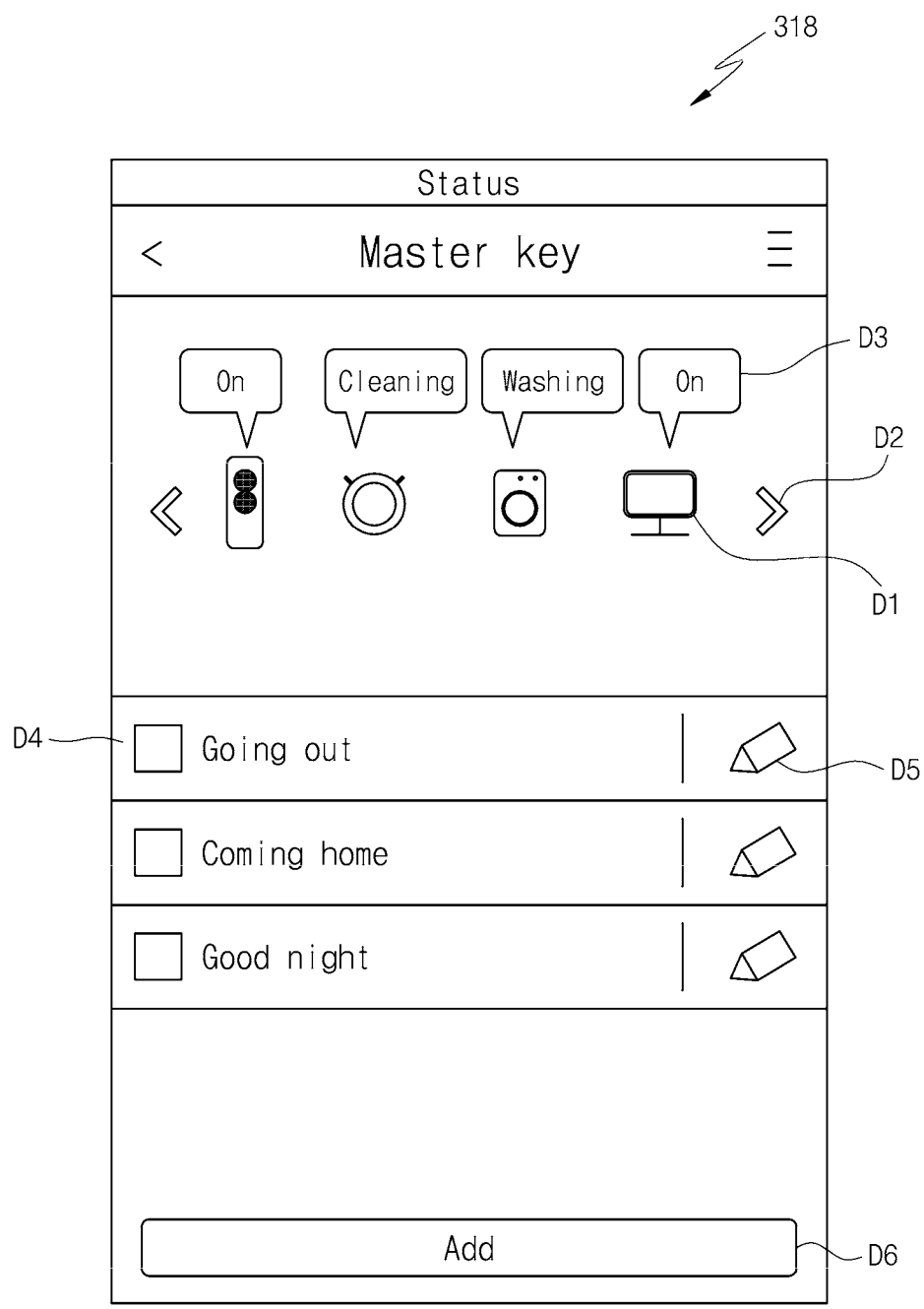
FIG. 9 is an exemplary diagram of a master key setting window (318) in a second plug-in screen of a control device according to an embodiment.
Figure 10:
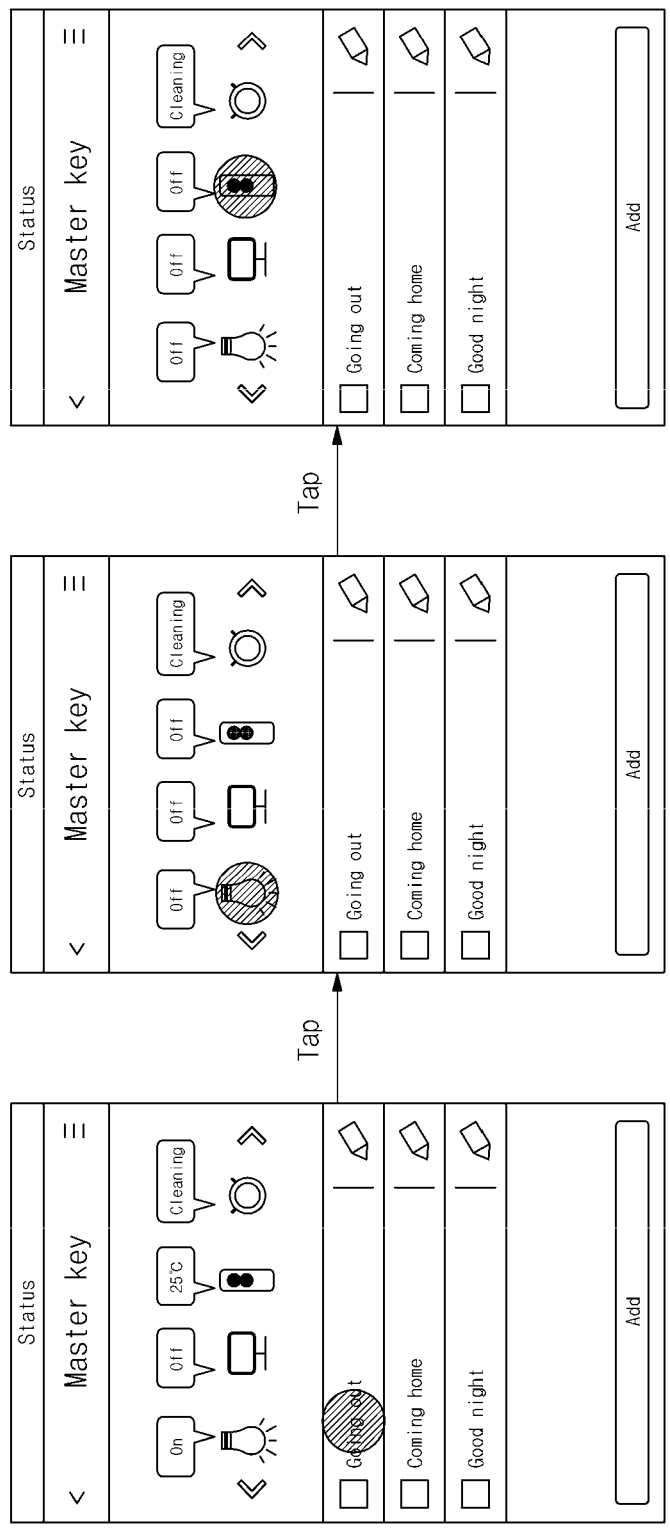
FIGS. 10 and 11 are exemplary diagrams showing the setting of the master key in the second plug-in screen of a control device according to an embodiment.
Figure 11:
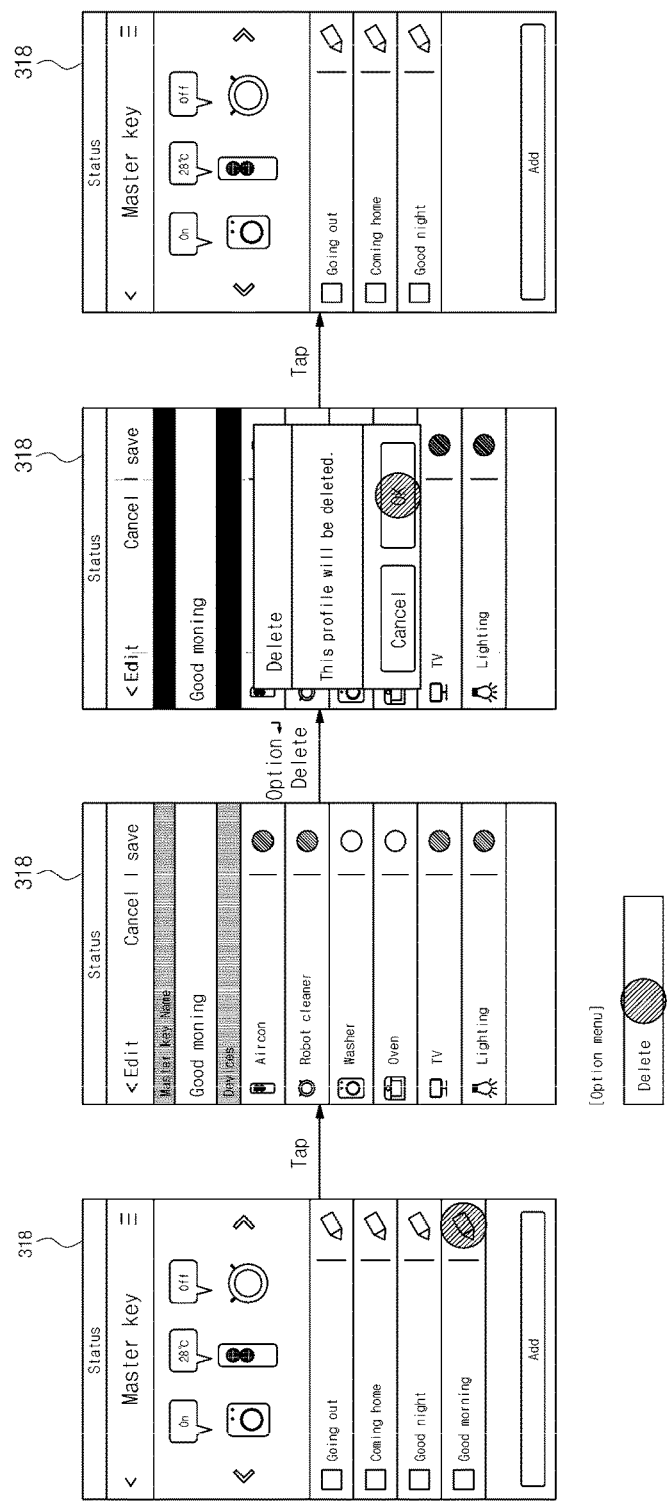
Figure 12A:
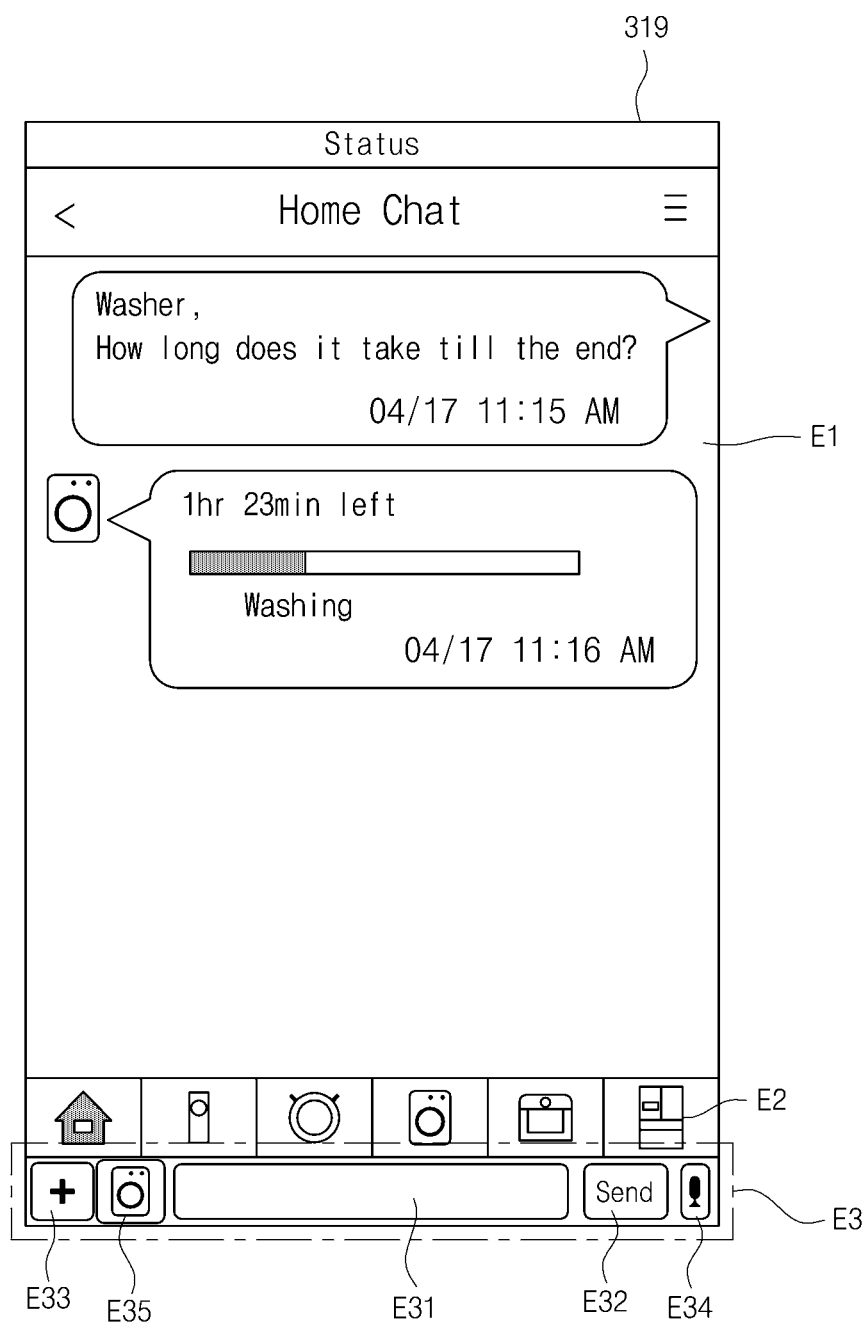
FIGS. 12A to 18 are exemplary diagrams showing the execution of a chatting unit in the dashboard screen of a control device according to an embodiment.
Figure 12B:
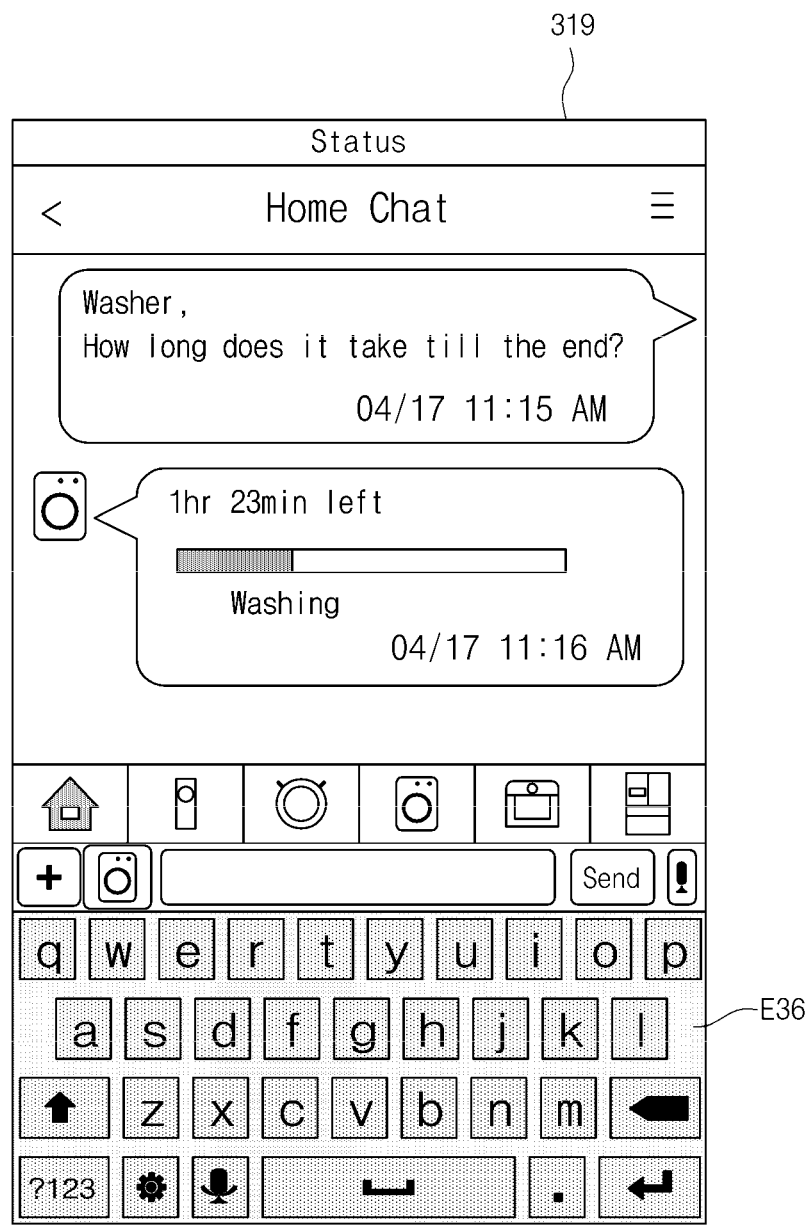
Figure 12C:
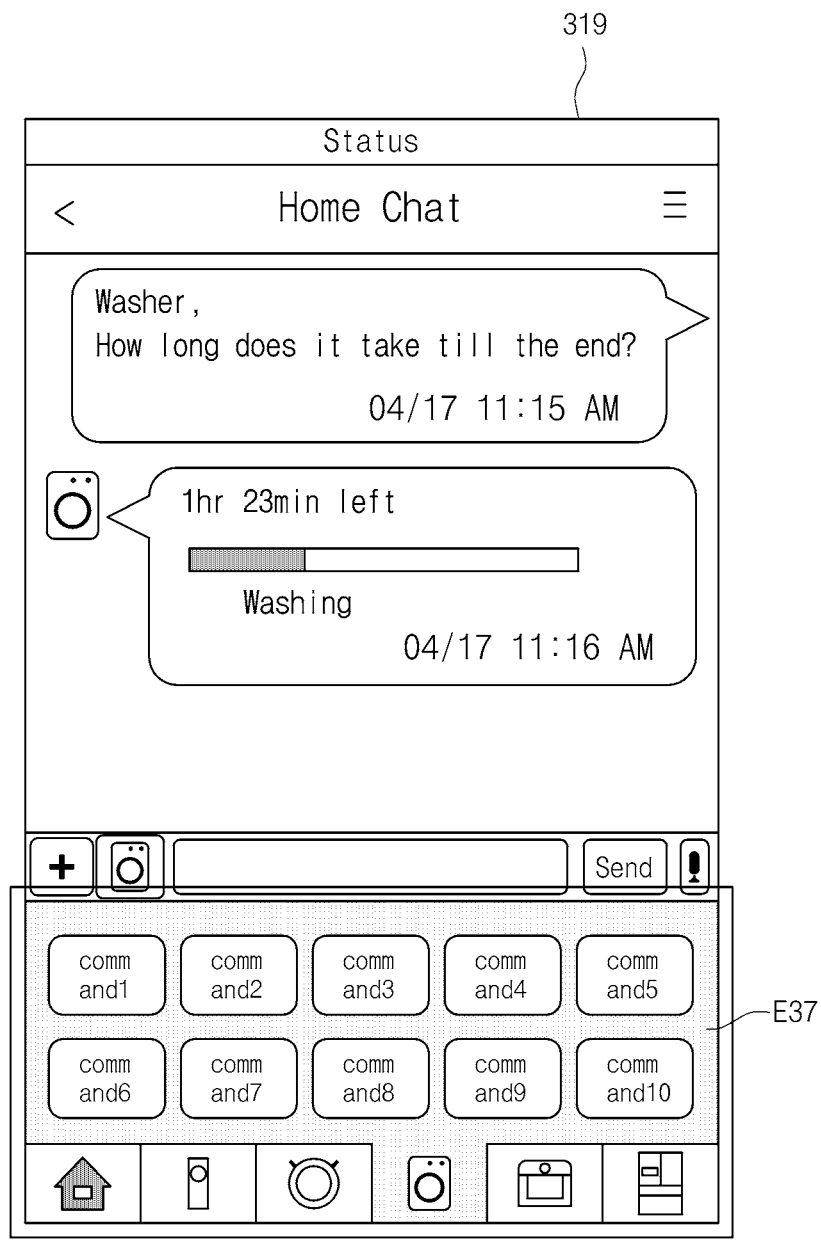
Figure 12D:
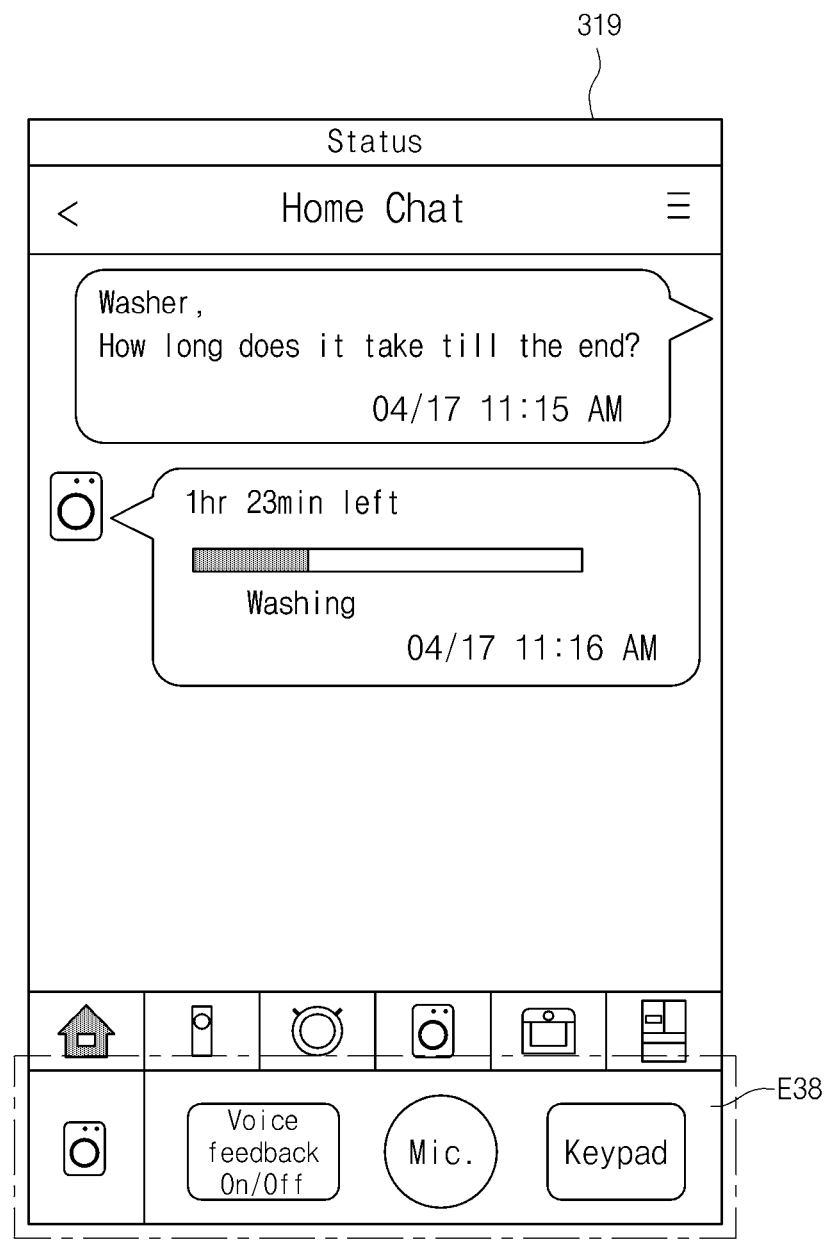

FIG. 9 is an exemplary diagram of a master key setting screen 318 in a second plug-in screen of a control device according to an embodiment, and FIGS. 10 and 11 are exemplary diagrams showing the setting of a master key in a second plug-in screen of a control device according to an embodiment.

When the master key setting button in the second plug-in screen is touched, the user interface unit 310 switches the dashboard screen into the master key setting screen 318.

As shown in FIG. 9, the master key setting screen 318 includes an icon D1 of an pre-registered electric device, a movement button D2 for moving a list of icons of electric devices, a speech bubble D3 that informs an operation command preset for each electric device, and a plurality of pre-registered buttons D4, an editing button D5 of each of the plurality of buttons, and an addition button D6 for adding an integral control button.

As shown in FIG. 10, on a condition that the light fixture is powered on, the television is powered off, the air conditioner is preset to a target indoor temperature of 25° C., and the cleaner is preset to be operating, when the going-out button is selected and the icon of the light fixture is touched, the master key setting screen 318 changes the operation command for the light fixture to an off state and then informs about the change through a speech bubble. When the icon of the air conditioner is touched, the master key setting screen 318 changes the operation command for the air conditioner to be an off state and then informs about the change through a speech bubble.

Thus, the preset command for each electric device corresponding to the going-out button of the master key includes powering off the light fixture, powering off the television, powering off the air conditioner, and operating the cleaner.

As shown in FIG. 11, on a condition that an going-out button, a coming-home button, a good-night button, and a good-morning button are set as integral control buttons, when an editing button of the good-morning button is touched, the master key setting screen 318 displays preset operation command information for each electric device corresponding to the good-morning button. In this case, when a deletion button of an option menu is touched, the master key setting screen 318 displays a window that informs that all information associated with the good-morning button is deleted. When an "OK" button is touched, the master key setting screen 318 displays a plurality of buttons from which the good-morning button has been removed.

FIGS. 12A to 12D are an exemplary diagram of a chatting screen when a chatting unit in a dashboard screen of a control device is executed according to an embodiment and exemplary diagrams illustrating the change in a chatting screen corresponding to a conversation input method.

When a chatting unit 313 is touched, the user interface unit 310 switches a dashboard screen to a chatting screen 319. This is the same as shown in portion (a) of FIG. 12.

As shown in portion (a) of FIG. 12, the chatting screen 319 includes a conversation display window E1 for displaying a conversation with at least one electric device, an icon selection window E2 for selecting an icon for at least one electric device or an icon for all electric devices, and a conversation input window E3 for selecting an input method of a conversation with at least one of pre-registered electric devices and inputting the conversation.

Here, the conversation input window E3 includes a text window E31 for selecting a message input method, a send button E32 for instructing to send a text sentence, a list button E33 for instructing to display a list of shortcut buttons implying chatting instructions, a microphone button E34 for instructing to input voice, and a target window E35 for displaying an icon of an electric device with which the user chats.

When a touch is input, the text window E31 displays a QWERT type keypad E36.

In addition, the keypad E36 includes a button for switching to Korean characters or numbers. When the switching button is touched, Korean characters or numbers may be displayed.

Portions (b), (c), and (d) of FIG. 12 are exemplary diagrams illustrating changes in the chatting screen corresponding to a conversation input method. They will be described with reference to FIGS. 13 to 18.

As shown in portion (b) FIG. 12, when the text window is touched, the keypad E36 is displayed, and thus a process for preparing a user to chat is performed.

Figure 13:
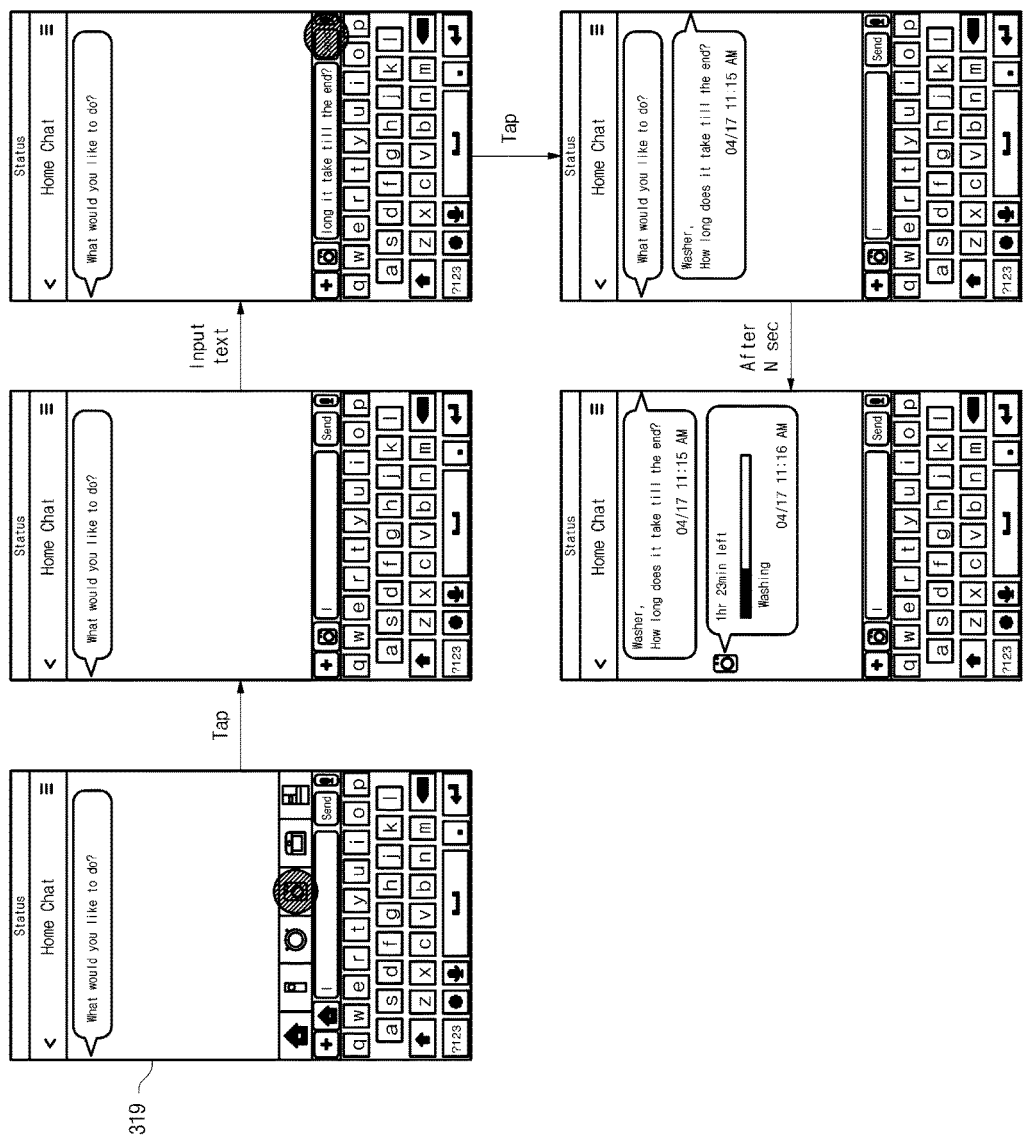

As shown in FIG. 13, when the icon of the washing machine is touched, the chatting screen 319 displays the icon of the washing machine on the target window. When the text window is touched, the chatting screen 319 displays the keypad E36, and thus performs a preparation process to allow the user to chat.

When a message for inquiring about a progress state of the washing machine is input, and then the send button is touched, the chatting screen 319 displays the input message on a representative display window, receives information regarding a current progress state from the washing machine, and displays the received progress state on a progress bar, etc.

In addition, the chatting screen displays a time at which the chatting word is input to the conversation display window together.

Figure 14:
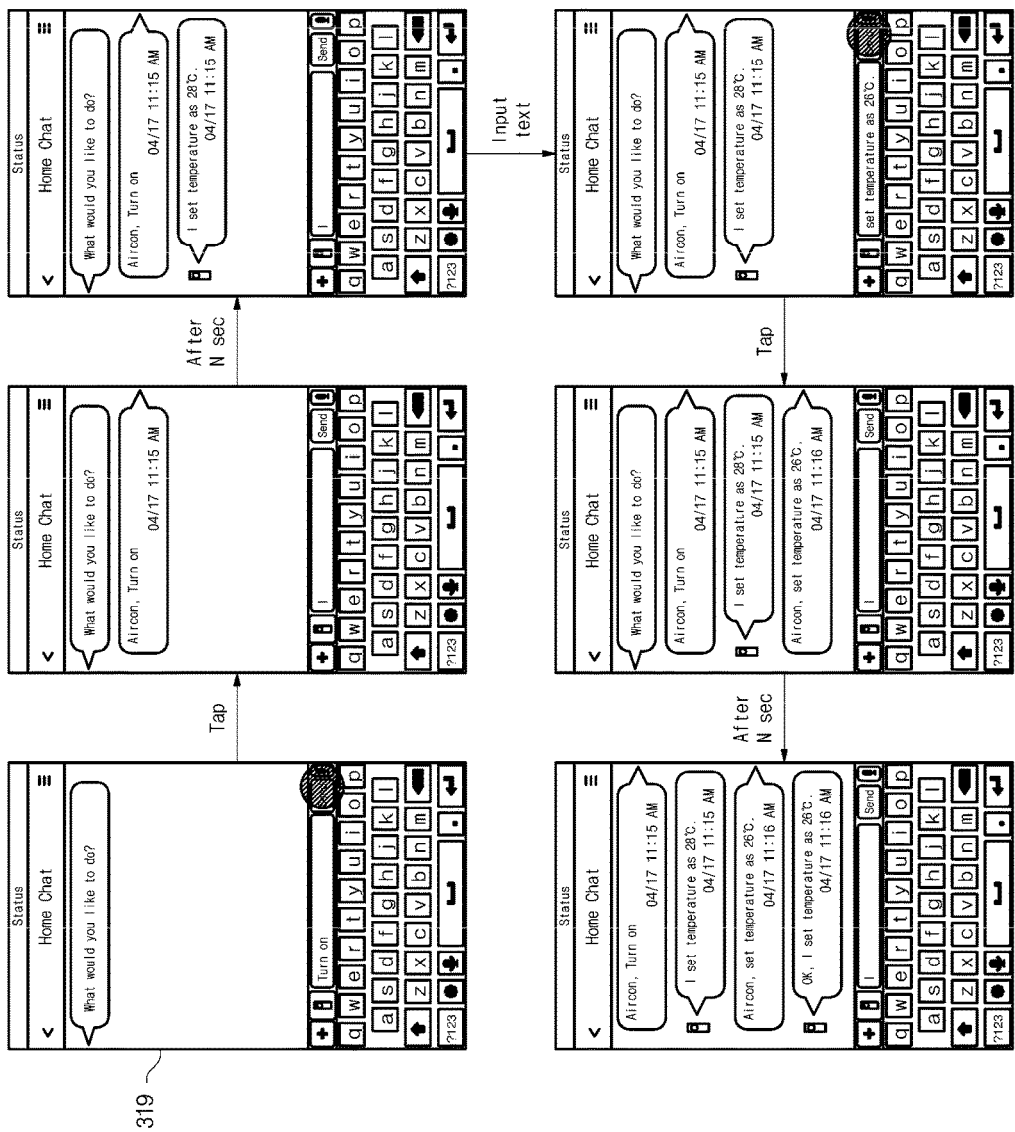

In addition, as shown in FIG. 14, when the icon of the air conditioner is touched, the chatting screen 319 displays the icon of the air conditioner on the target window. When the text window is touched, the chatting screen 319 displays the keypad E36, and thus performs a preparation process to allow the user to chat.

When an operation command is input through a message, and then the send button is touched, the chatting screen 319 displays the input on-operation command on the conversation display window and displays a current indoor temperature provided by the air conditioner. When a target indoor temperature is input through a message, and then the send button is touched, the chatting screen 319 displays the input target indoor temperature on the conversation display window, receives a response that the command will be performed from the air conditioner, and displays the received response on the conversation display window.

Figure 15:
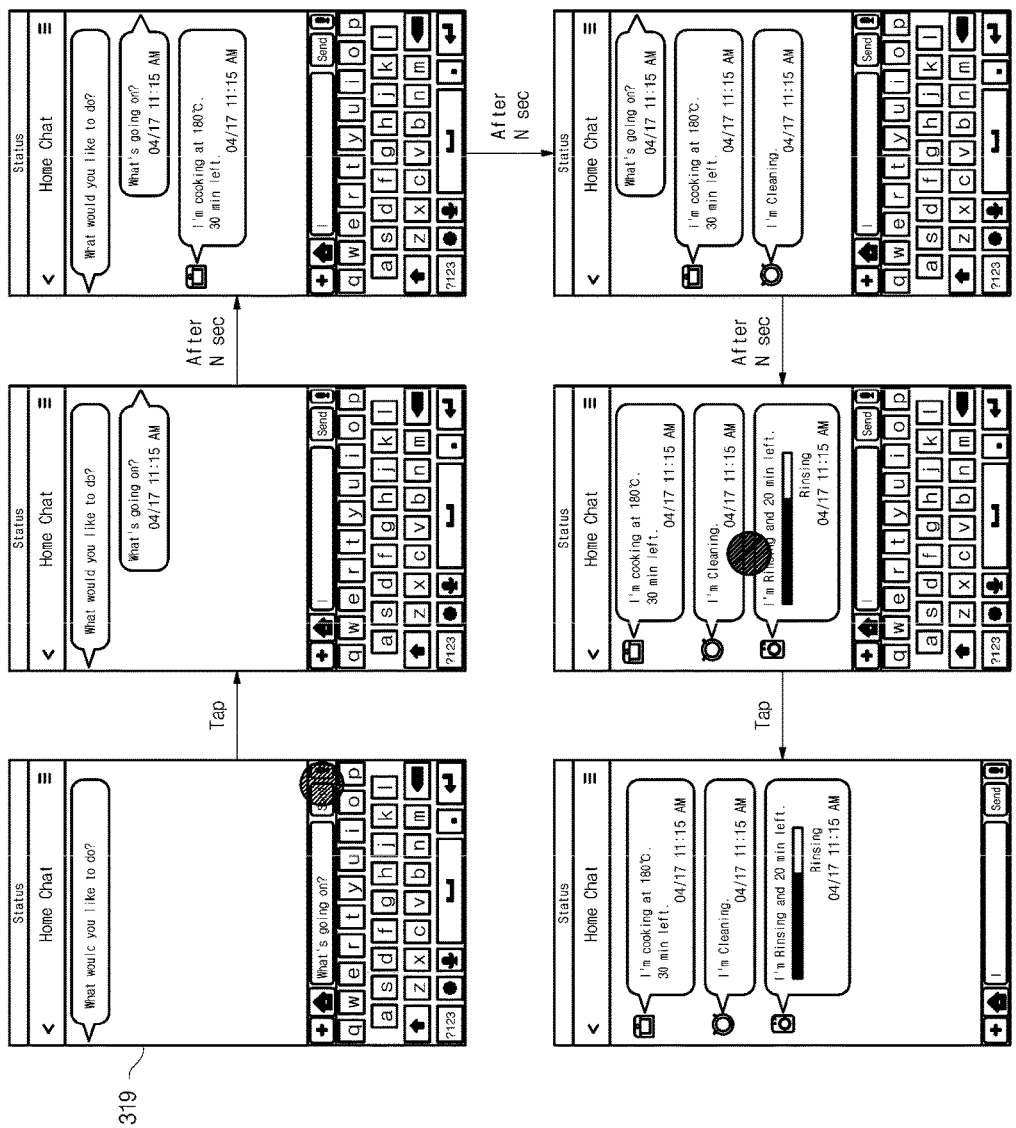

As shown in FIG. 15, when an icon for selecting all devices is selected, the chatting screen 319 displays the icon for selecting all devices on the target window. When the text window is touched, the chatting screen 319 displays the keypad E36 and thus performs a preparation process to allow the user to chat.

When a chatting word for monitoring all devices is input through a keypad, the chatting screen 319 displays the input chatting word on the conversation display window. When monitoring information is received from a pre-registered electric device, the chatting screen 319 displays the received monitoring information for each electric device on the conversation display window.

When the conversation display window is touched while the monitoring information for each electric device is displayed, the chatting screen 319 hides the keypad.

Figure 16:
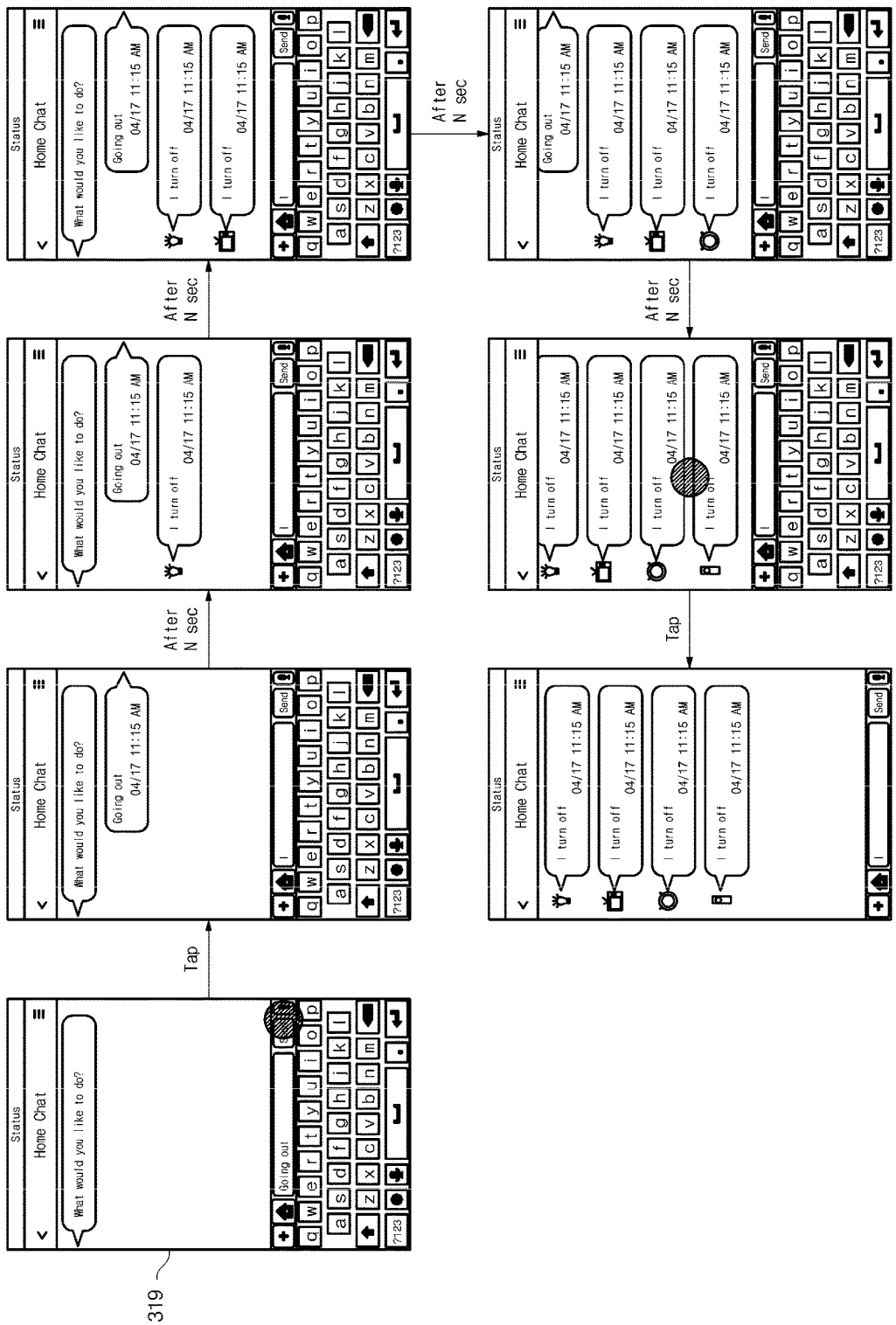

As shown in FIG. 16, when an icon for selecting all devices is selected, the chatting screen 319 displays the icon for selecting all devices on the target window. When the text window is touched, the chatting screen 319 displays the keypad E36 and thus performs a preparation process to allow the user to chat.

When a chatting word for informing all devices of the going-out is input through the keypad, the chatting screen 319 displays the input chatting word on the conversation display window. When operation state information corresponding to the going-out is received from a pre-registered electric device, the chatting screen 319 displays the received operation state information for each electric device on the conversation display window.

When the conversation display window is touched while the operation state information for each electric device is displayed, the chatting screen 319 hides the keypad.

When the icon of the air conditioner is touched, the chatting screen 319 displays the icon of the air conditioner on the target window. When the text window is touched, the chatting screen 319 displays the keypad E36 and thus performs a preparation process to allow the user to chat.

When an operation command is input through a message, and then the send button is touched, the chatting screen 319 displays the input on-operation command on the conversation display window and displays a current indoor temperature provided by the air conditioner. When a target indoor temperature is input through a message, and then the send button is touched, the chatting screen 319 displays the input target indoor temperature on the conversation display window, receives a response that the command will be performed from the air conditioner, and displays the received response on the conversation display window.

As shown in portion (c) of FIG. 12, when the list button E33 is touched, the chatting screen 319 displays a plurality of shortcut buttons E37 on which respective chatting instructions are displayed and thus performs a preparation process to allow the user to chat.

Figure 17:
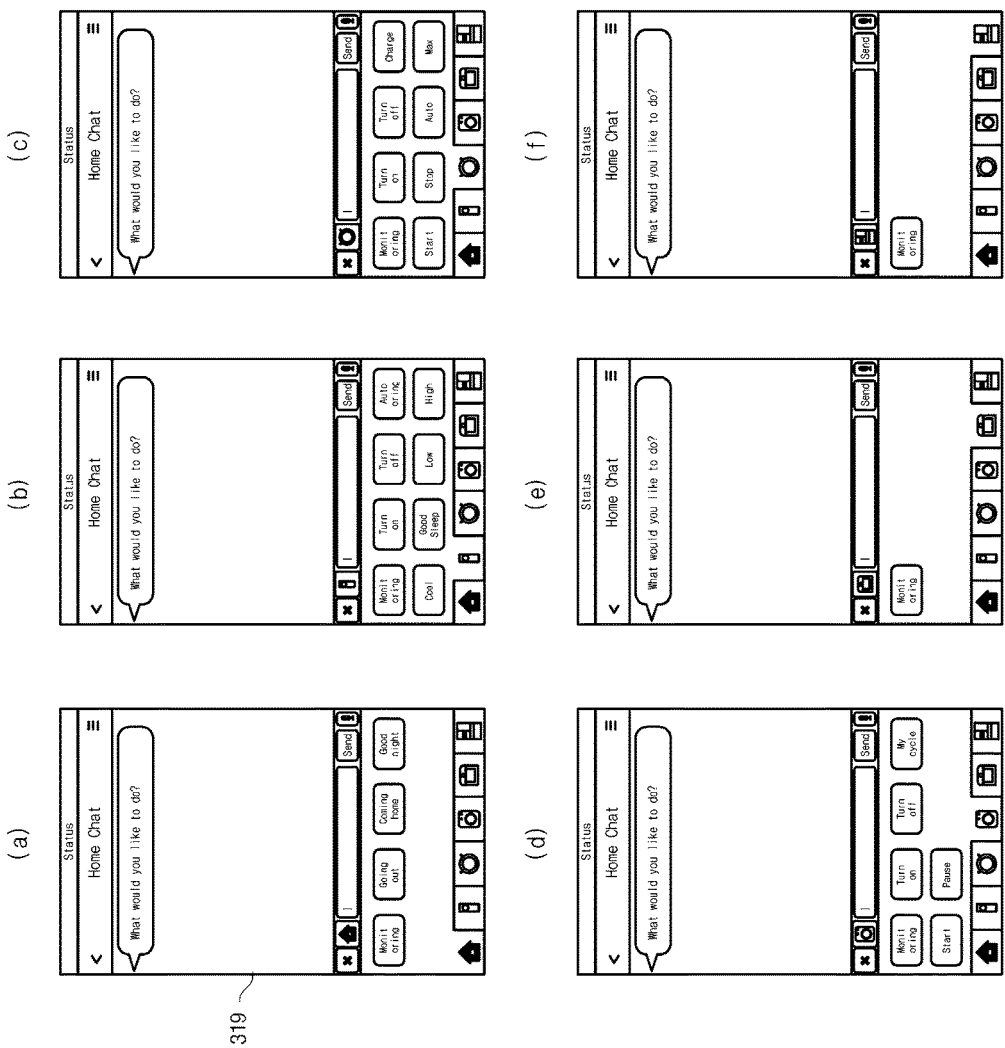

FIG. 17 shows an example of a shortcut button for each pre-registered electric device.

Portion (a) of FIG. 17 is an exemplary diagram of a shortcut button list corresponding to the icon for selecting all devices. When the icon for selecting all devices is selected, a plurality of shortcut buttons have respective operation commands for integrally controlling all of the pre-registered electric devices. In addition, the plurality of shortcut buttons for sending the control command to all devices correspond to buttons of the master key.

Portion (b) of FIG. 17 is an exemplary diagram of a shortcut button list corresponding to the operation control of the air conditioner, portion (c) of FIG. 17 is an exemplary diagram of a shortcut button list corresponding to the operation control of the robot cleaner, portion (d) of FIG. 17 is an exemplary diagram of a shortcut button list corresponding to the operation control of the washing machine, portion (e) of FIG. 17 is an exemplary diagram of a shortcut button list corresponding to the operation control of the cooking appliance, and portion (f) of FIG. 17 is an exemplary diagram of a shortcut button list corresponding to the operation control of the refrigerator.

Figure 18:
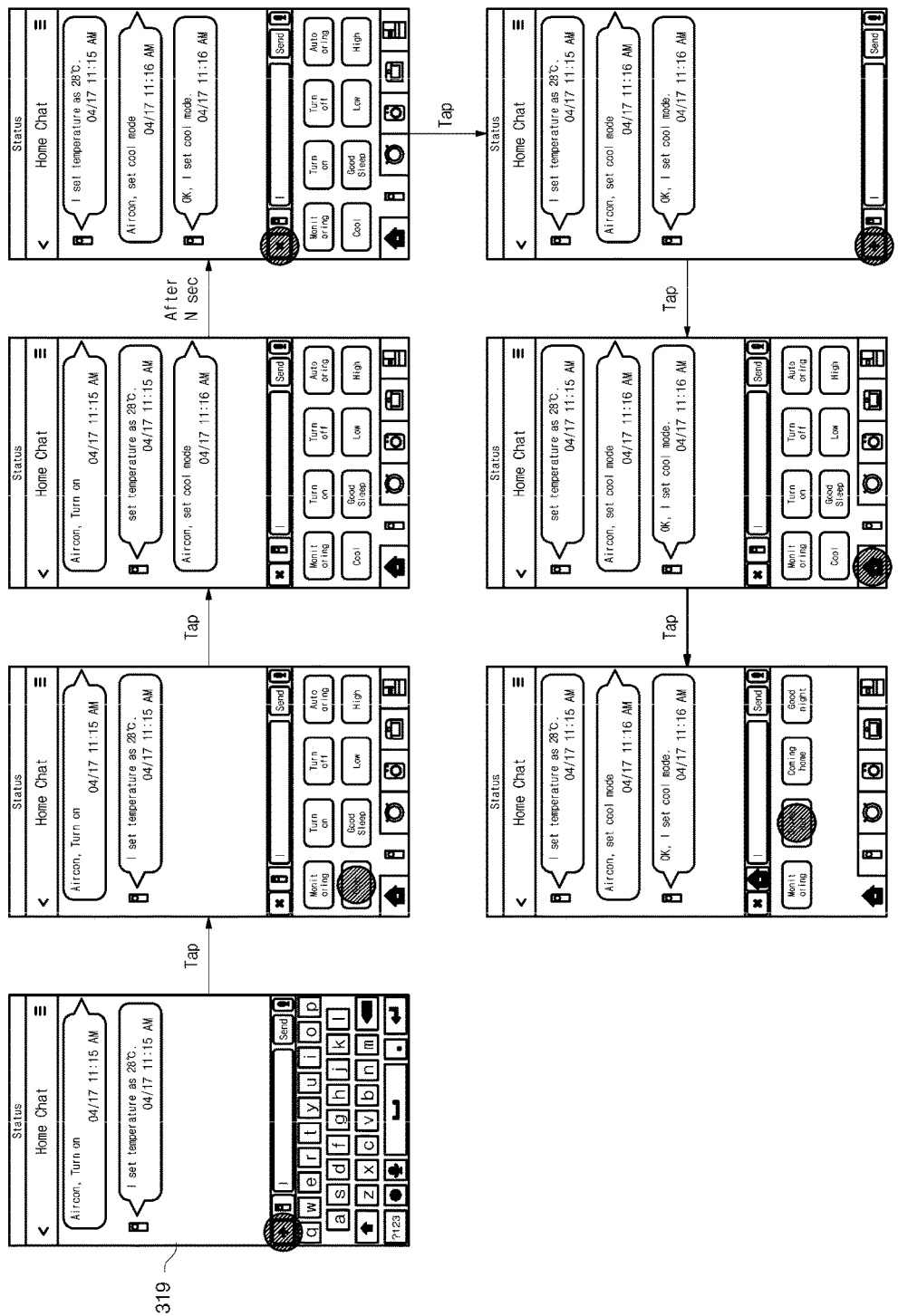

As shown in FIG. 18, when the icon of the air conditioner is touched, the chatting screen 319 displays the icon of the air conditioner on the target window. When information regarding a current indoor temperature is received from the air conditioner, the chatting screen 319 displays the received current indoor temperature on the conversation display window.

When the list button is touched, the chatting screen 319 displays the plurality of shortcut buttons E37 on which the chatting instructions for operation control associated with the air conditioner are displayed.

When a shortcut button for instructing air-conditioning is touched among the plurality of shortcut buttons, the chatting screen 319 displays a conversation corresponding to the touched shortcut button on the conversation display window, receives an operation state from the air conditioner, and displays a conversation of "an air conditioning operation will be performed." When the list button is touched after a predetermined period of time has passed, the chatting screen 319 hides the list button. Subsequently, when the list button in the conversation input window is touched, the chatting screen 319 displays the icon selection window and the shortcut button list.

When the icon for selecting all devices is touched while the icon selection window and the shortcut button list are displayed, the chatting screen 319 displays the icon for selecting all devices on the target window and displays a list of shortcut buttons corresponding to the icon for selecting all devices.

Subsequently, when the going-out button is touched among the plurality of shortcut buttons, the chatting screen 319 displays a conversation informing that the going-out button has been touched on the conversation display window and sends a preset operation command for each electric device corresponding to the going-out button to each electric device.

In addition, the chatting screen displays a time at which the chatting word is input to the conversation display window together.

As shown in portion (d) of FIG. 12, when the microphone button E34 is touched, the chatting screen 319 displays a voice input window E38 for receiving a voice command and thus performs a preparation process to allow the user to chat.

As shown in portion (d) of FIG. 12, when the icon of the washing machine is touched, the chatting screen 319 displays the icon of the washing machine on the target window. When the microphone button E34 is touched, the chatting screen 319 displays a voice input window E38 for inputting a voice command and thus performs a preparation process to allow the user to chat.

In addition, the voice input window includes a button for setting a voice command feedback, a button for inputting a voice, and a keypad switching button for performing switching to the keypad.

When a word is uttered while the button for inputting a voice is touched, the chatting screen 319 collects and then recognizes the voice through a microphone, and displays the recognized voice on the conversation display window. When a query corresponding to the recognized voice is about a progress state of the washing machine, the chatting screen 319 receives information regarding a current progress state from the washing machine and displays the received progress state using a progress bar, etc.

In addition, the chatting screen displays a time at which the chatting word is input to the conversation display window together.

The home view unit 314 may output interior images of the user's home at predetermined intervals. When a touch command is input, the home view unit 314 may expand a home view image and output the expanded image to the dashboard screen.

In addition, the home view unit 314 may output a previous image in response to the user's command.

Figure 19:
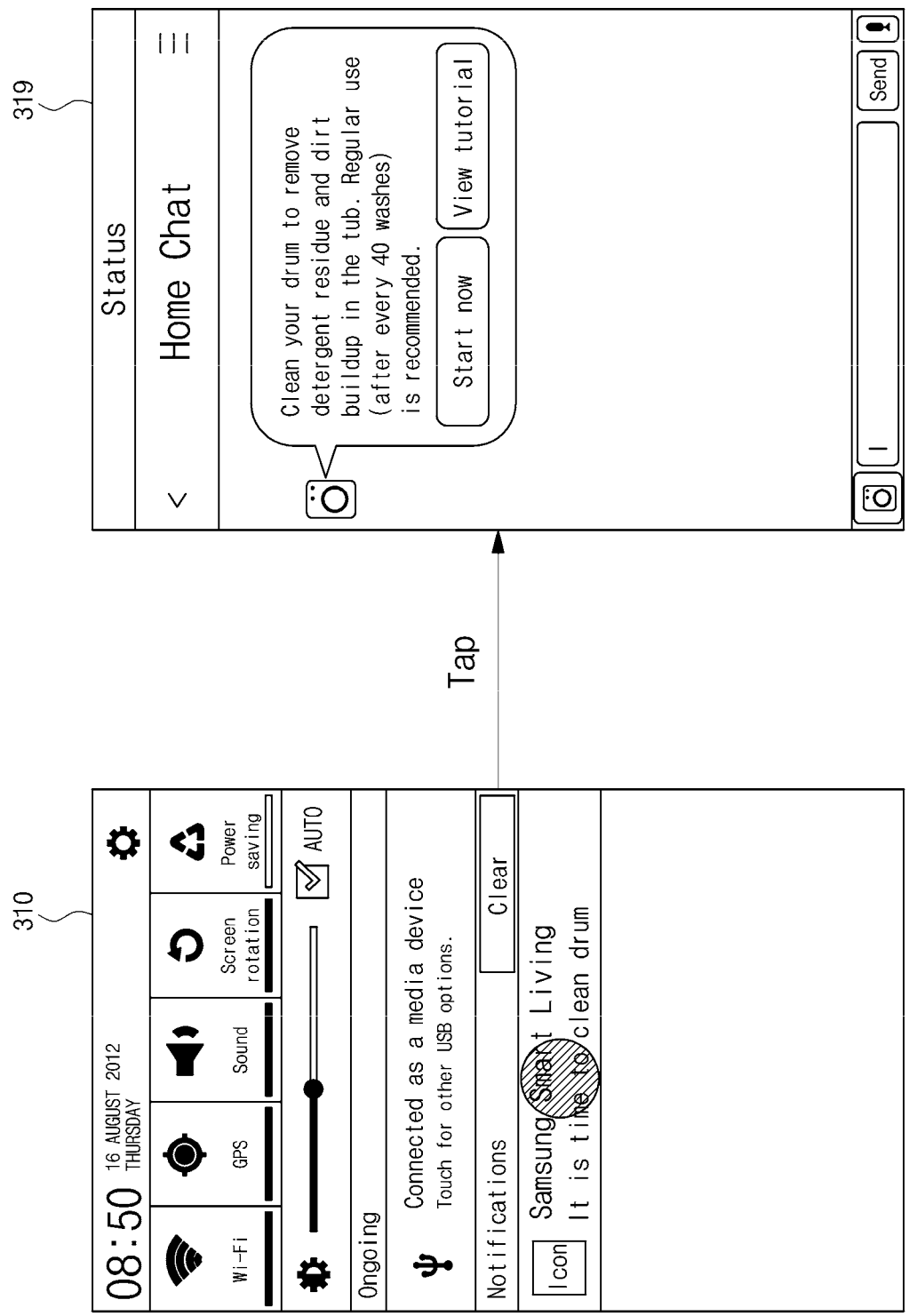
FIGS. 19 and 20 are exemplary diagrams showing a quick panel window displayed on a home screen of a control device according to an embodiment.
Figure 20:
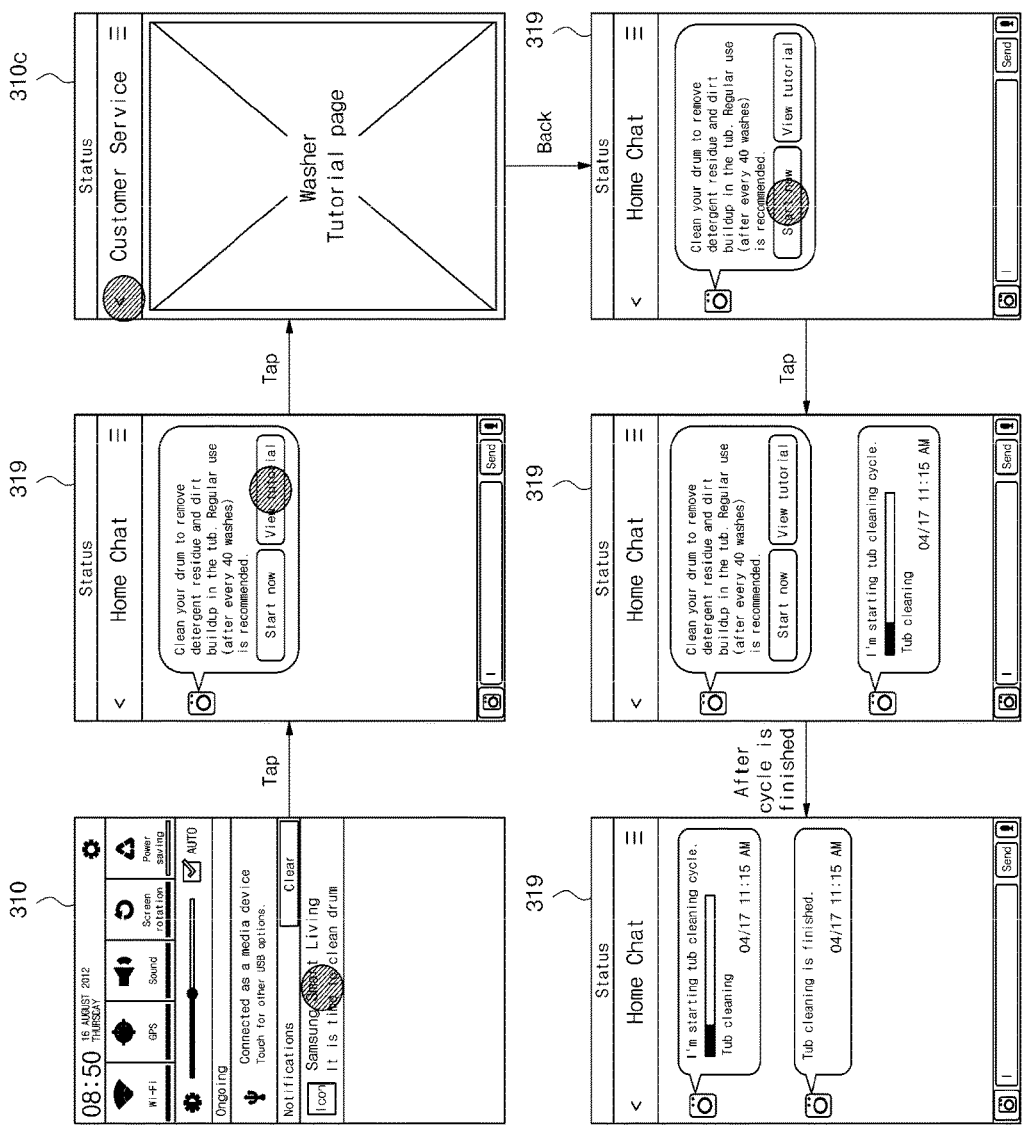

FIGS. 19 and 20 are exemplary diagrams showing a quick panel window displayed on a home screen of a control device according to an embodiment.

As shown in FIG. 19, the control device determines whether an operation state of at least one electric device has been changed while an app is not executed. When it is determined that the operation state of the at least one of electric device has been changed, the control device displays notification information corresponding to the change in the operation state on a home screen of the user interface unit 310 through a quick panel window.

In addition, while the app is not executed, the control device displays notification information about an update, error, and management period of the at least one electric device on the home screen through the quick panel window.

When the notification information in the quick panel window is touched, the user interface unit 310 displays in detail information about a corresponding electric device.

As shown in FIG. 20, the user interface unit may display a tutorial about the corresponding electric device and perform association with an operation for managing the washing machine.

For example, when a button for instructing to clean a laundry drum is touched while a message such as "clean laundry drum of washing machine" is displayed, the user interface unit sends a laundry drum cleaning command to the washing machine and displays a cleaning-in-progress state of the laundry drum on the user interface unit.

Figure 21:
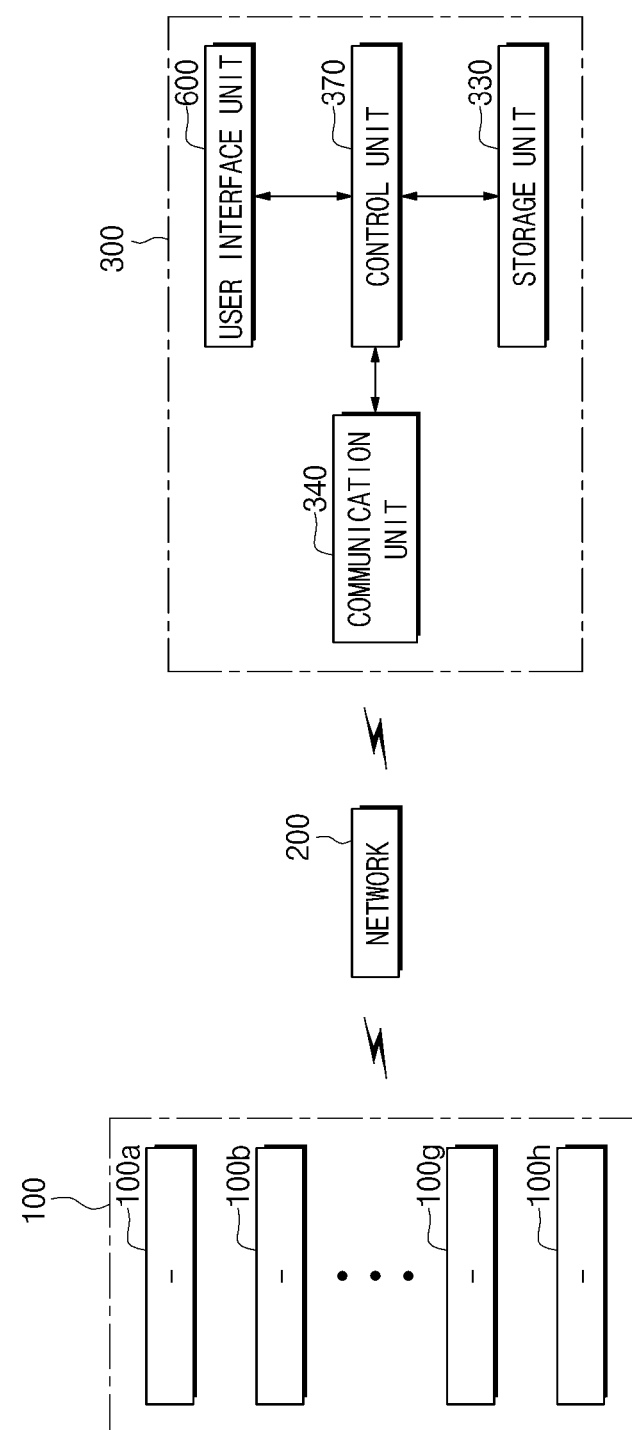
FIG. 21 is a control block diagram showing a control device according to another embodiment.

FIG. 21 is a control block diagram of a control device according to another embodiment, which will be described with reference to FIG. 22.

As shown in FIG. 21, a control device 300 communicates with another control device, and sends a control command to at least one of a plurality of electric devices on the basis of an operation command or information associated with the operation command sent by the other control device.

Here, the other control device is an information technology (IT) device that may be installed in a human body, and may be a wearable device provided as, e.g., a wrist watch, a belt, or glasses. The wearable device is capable of input/output and communication.

For example, the control device 300 may be a smartphone that communicates with a wrist-watch-type device, and the other control device may be a wrist-watch-type device.

Alternatively, the control device 300 may be a TV associated with a TV remote controller, and the other control device may be a separate TV remote controller.

That is, the other control device receives an operation command for at least one of a plurality of electric devices from a user and transmits the received operation command to a control device 300 which is pre-registered. An app for controlling an electric device in the home may be installed in the other control device.

Although not shown, the other control device may include an input unit.

Examples of an input through the input unit of the other control device may include a touch input, an electronic pen, a pointing device (e.g., a mouse, etc.), a keyboard, a voice, and an operation.

In addition, the other control device may include an output unit.

Examples of an output through the output unit of the other control device may include an output through a display unit such as a touch panel, etc., a voice output, a vibration output, and a light output.

The control device 300 and the other control device may be connected by wire or wirelessly. The wired connection scheme may include Mobile High-Definition Link (MHL) and Universal Serial Bus (USB), and the wireless connection scheme may include Bluetooth, WiFi, Zigbee, IrDA, and short-range communication.

Although not shown, a method of controlling an electric device using the control device 300 and the other control device will be described, for example, as follows.

The input through the other control device may be a voice input. When the other control device has a touch panel, the input may be a touch input.

On a condition that a control command is input to the other control device through the voice input, when the other control device transfers voice information to the control device, the control device 300 analyzes the voice, acquires a corresponding instruction, and performs a control operation corresponding to the instruction.

Alternatively, when the other control device digitalizes or encodes voice information and transfers the digitalized or encoded voice information to the control device 300, the control device 300 analyzes the digitalized or encoded information, acquires a corresponding instruction, and performs a control operation corresponding to the instruction.

Alternatively, when the other control device analyzes voice information and transfers specific information indicating a result of the analysis to the control device 300, the control device 300 acquires a command associated with the specific information and performs a control operation corresponding to the instruction.

Alternatively, when the other control device analyzes voice information, acquires an instruction corresponding to the voice information, and transmits the acquired instruction to the control device 300, the control device 300 performs a control operation corresponding to the instruction.

On a condition that a control command is input to the other control device through the touch input, when the other control device transfers information corresponding to a touched icon to the control device 300, the control device 300 acquires an instruction corresponding to the information and performs a control operation corresponding to the instruction.

Alternatively, when the other control device acquires the corresponding command through the information corresponding to the touched icon and transmits the acquired instruction to the control device 300, the control device 300 performs a control operation corresponding to the instruction.

Here, the control command may be a command for controlling a plurality of electric devices.

When the command for controlling the plurality of electric devices is input to the other control device, the other control device determines whether the input command is the command for controlling the plurality of electric devices and transmits a result of the determination to the control device 300.

The determination result may be transmitted simultaneously with, or separately from, the input command.

Alternatively, the other control device determines whether the input command is the command for controlling the plurality of electric devices. When the input command is a command for controlling the plurality of electric devices, the other control device directly transmits a control command to electric devices to be controlled, instead of through the control device 300.

Alternatively, when the command for controlling the plurality of electric devices is input to the other control device, the control device 300 determines whether the command for controlling the plurality of electric devices is valid and performs a corresponding control operation.

When using the other control device as described above, the user may simply control a home electric device through a wrist-watch-type device or a TV remote controller.

For example, the user may collectively power off home appliances by saying, to the wrist-watch-type device, "Good night."

A control device according to another embodiment has a different chatting configuration from the control device according to an embodiment.

As shown in FIG. 21, the control device 300 includes a user interface unit 600, a control unit 370, a storage unit 330, and a communication unit 340.

The user interface unit 600 outputs operation states of pre-registered electric devices among the plurality electric devices disposed in the home and receives an operation command for at least one of the pre-registered electric devices.

The user interface unit 600 includes a display unit for displaying the operation states of the pre-registered electric devices and an input unit for receiving the operation command from the user.

Here, the input unit is a touch panel for receiving an operation command, and the user interface unit 600 may be implemented as a touch screen into by integrally forming a display panel of the display unit and the touch panel of the input unit.

In addition, the input of the input unit may be received through an electronic pen, a pointing device (mouse, etc.), a keyboard, voice recognition, and gesture recognition in addition to the touch panel.

In this case, the input unit may be formed separately from the display panel of the display unit. However, when the input unit is a touch type electronic pen, the input unit may be formed integrally therewith.

The user interface unit 600 displays an icon of an app for monitoring and controlling an electric device on the home screen, transmits an app selection signal to the control unit 370 when the icon of the app is selected by the user, and displays a screen corresponding to an execution of the app on the basis of a command of the control unit 370.

When a chatting unit displayed on the home screen of the user interface unit 600 is touched, the home screen is switched to a chatting screen.

When a chatting unit of a dashboard screen is touched, the user interface unit 600 switches the dashboard screen to a chatting screen 600a and displays the chatting screen 600a. This is the same as shown in portion (a) of FIG. 22.

Figure 22:
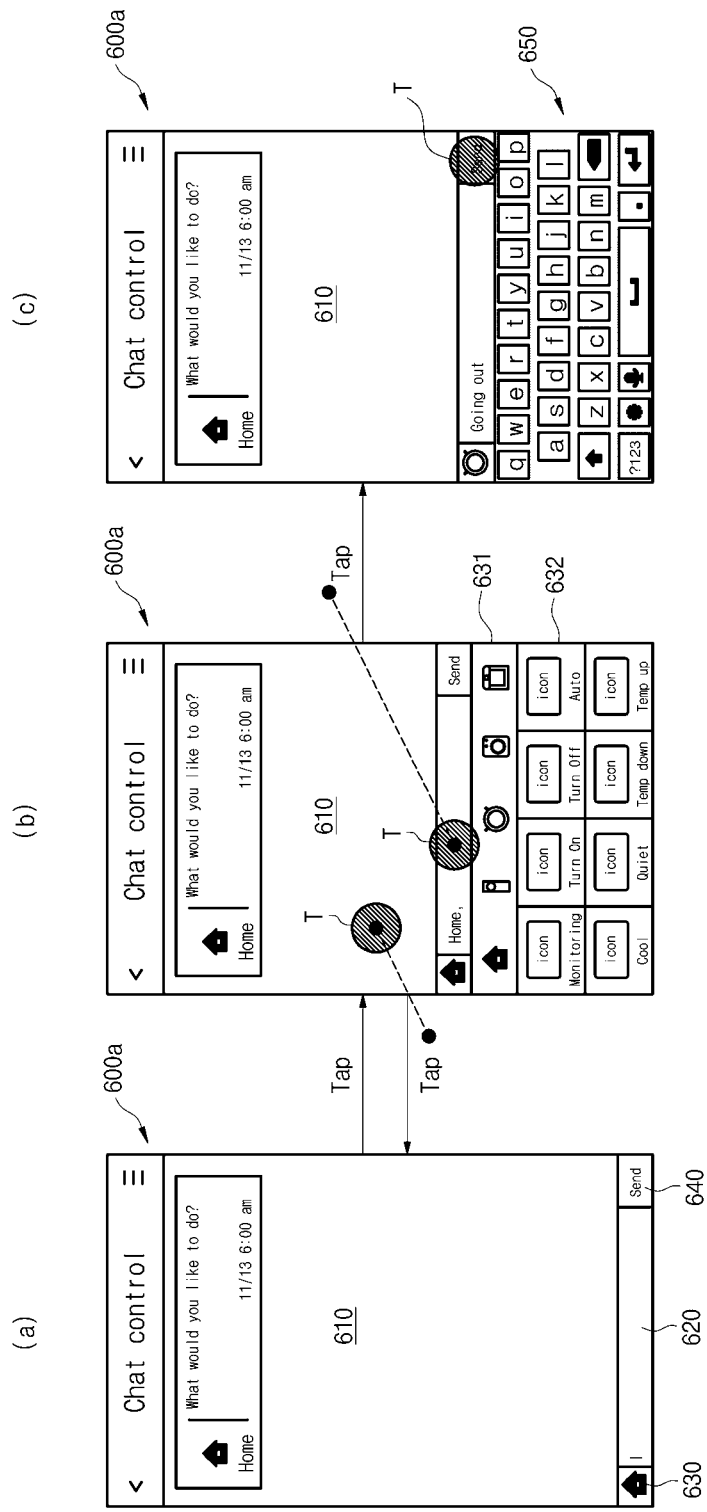
FIG. 22 is an exemplary diagram showing the display of a chatting screen of a control device according to another embodiment.

As shown in portion (a) of FIG. 22, the chatting screen 600a includes a conversation display window 610 for displaying a conversation with at least one electric device, a conversation input window 620 for selecting an input method of a conversation with at least one of pre-registered electric devices and inputting the conversation, an icon selection window 630 for selecting an icon for at least one electric device whose operation is to be monitored and controlled or an icon for all electric devices, and a send button 640 for transferring text.

As shown in portion (b) of FIG. 22, when all electric devices displayed in the icon selection window are selected or when a home icon for controlling a plurality of electric devices is selected, the chatting screen 600a of the user interface unit 600 additionally outputs a target window 631 for displaying a list of the pre-registered electric devices and a shortcut word button window 632 for displaying a predetermined instruction.

In addition, the target window 631 and the shortcut word button window 632 or the shortcut word button window 632 other than the target window 631 may be output as a text window 650.

As shown in portion (c) of FIG. 22, when the conversation input window 620 is selected, the chatting screen 600a of the user interface unit 600 additionally outputs the text window 650 for selecting a character input scheme.

Here, when the touch is input, the text window 650 includes a QWERT type keypad or a 10-key type keypad.

In addition, the keypad includes a button for switching to Korean characters or numbers. When the switching button is touched, Korean characters or numbers may be displayed.

Alternatively, the user interface unit may further display a microphone button that instructs a voice input.

When the conversation display window 610 is touched, the chatting screen 600a of the user interface unit switches the target window, the shortcut word button window, or the text window to a hidden state.

When the app is executed, the control unit 370 controls the user interface unit 600 such that operation states of pre-registered electric devices or notification information needed for the user is output, and controls transmission of a signal corresponding to an operation command for at least one electric device on the basis of an operation command input to the user interface unit 600 by touch.

When a batch control instruction is input, the control unit 370 switches a conversation partner device to all devices.

Here, the batch control instruction is not an instruction for controlling one electric device but an instruction predefined to control a plurality of electric devices.

The control unit 370 performs control to transmit individual control instructions associated with a batch control or a batch control instruction itself to a plurality of electric devices associated with the batch control instruction.

In addition, the control unit 370 performs control to transmit the batch control instruction to all electric devices in the home.

Here, the individual control instruction is an instruction to be performed by a corresponding electric device in association with the batch control instruction.

When an individual control instruction corresponding to any one electric device is input, the control unit 370 automatically switches the corresponding electric device to a conversation partner device. When the device name of an electric device is input, the conversation partner device is switched to an electric device having the input device name.

The control unit 370 may receive a selection of the batch control instruction or the individual control instruction through the shortcut word button window rather than the text window.

Such a configuration of the control unit will be described below in detail on the basis of an example of an input/output of a chatting screen.

The storage unit 330 stores identification information of home electric devices registered by the user and an app for monitoring and controlling the pre-registered electric devices and stores the batch control instruction and the individual control instructions.

The storage unit 330 stores similar control instructions and recommended instructions for each character and stores an operation command for each instruction.

The communication unit 340 communicates with an electric device and a home server in the home.

An example of displaying chatting of the chatting screen of the user interface unit will be described in detail with reference to FIGS. 23 to 27.

Figure 23:
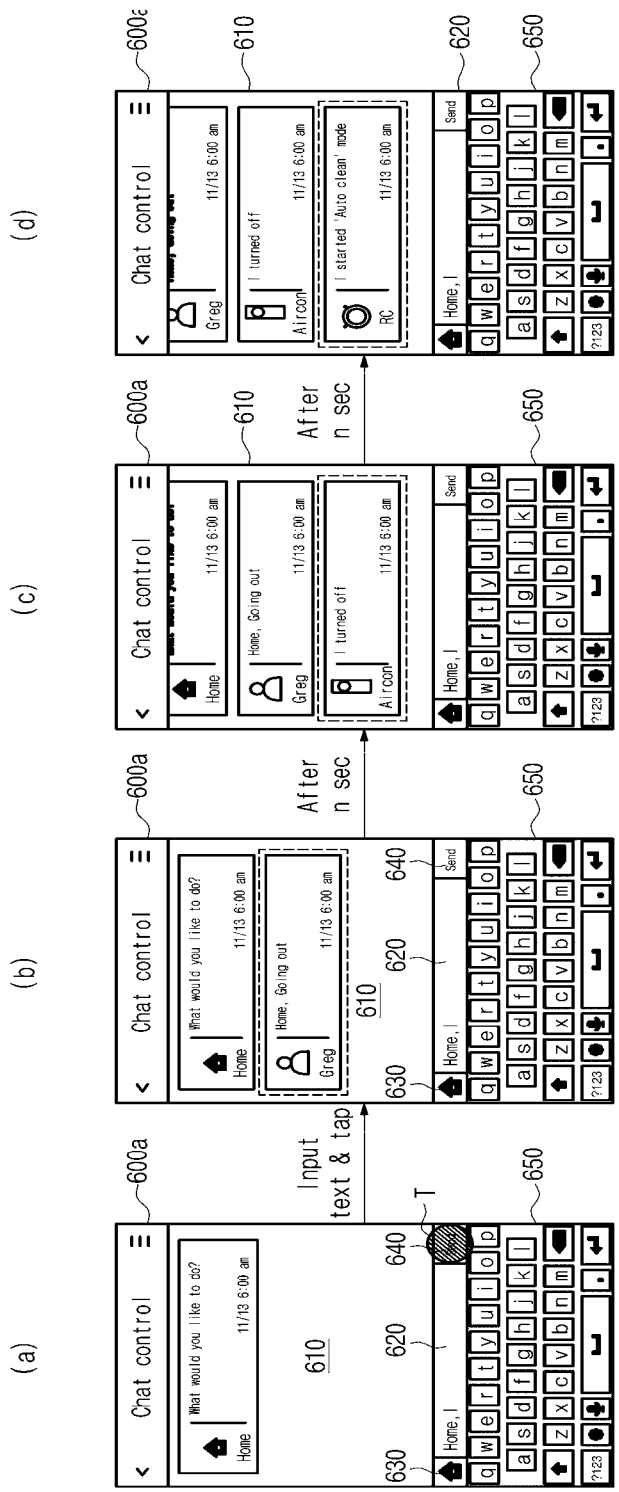
FIGS. 23 and 24 are exemplary diagrams showing the display of the chatting screen of a user interface unit provided in a control device according to another embodiment.
Figure 24:
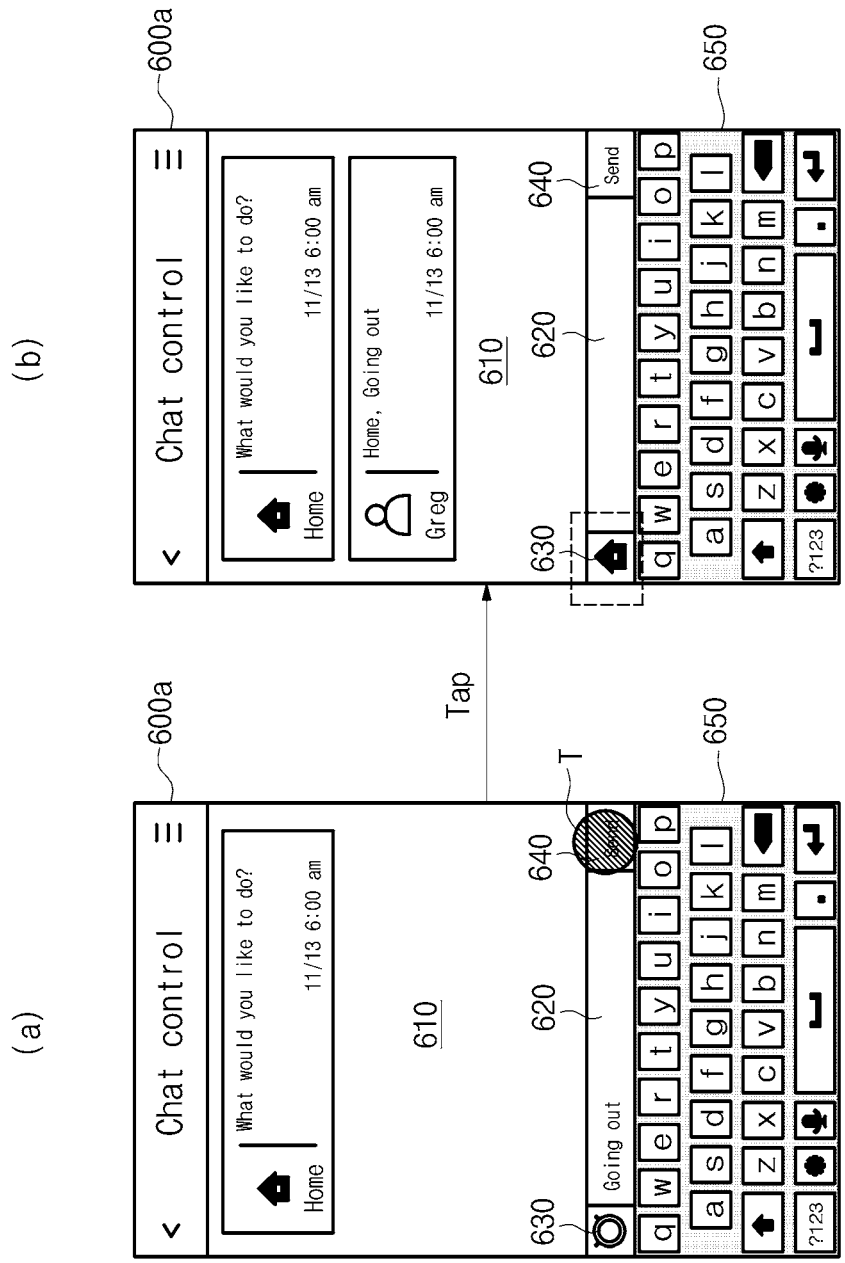

FIGS. 23 and 24 are exemplary diagrams of a chatting screen that is used to collectively control a plurality of electric devices.

As shown in FIG. 23, when the icon selection window 630 is touched, the user interface unit displays an icon (e.g., a house shaped icon) of a pre-registered electric device. When an icon for all devices is touched among icons of the pre-registered electric devices is touched, the user interface unit displays the icon for all devices on the icon selection window 630.

When the batch control instruction for the plurality of electric devices is input through the conversation input window 620 of the user interface unit, the control unit transmits individual control instructions associated with a batch control (that is, instructions to be performed by a corresponding device in association with the batch control instruction) or the batch control instruction itself to a plurality of electric devices associated with the batch control instruction. In addition, the control unit transmits the batch control instruction to all electric devices in the home.

When the batch control instruction is input to the conversation input window 620 of the user interface unit together with a word (e.g., a home or a nickname thereof) referring to all devices, the control device may transmit individual control instructions associated with a batch control (that is, instructions to be performed by a corresponding device in association with the batch control instruction) or the batch control instruction itself to a plurality of electric devices associated with the batch control instruction.

In addition, the control unit may transmit the batch control instruction to all electric devices in the home. In this case, the batch control can be easily performed irrespective of who was a conversation partner before the batch control instruction is input.

After the batch control instruction is transmitted, the control unit allows information about the result to be displayed on the conversation display window 610 of the chatting screen of the user interface unit.

As shown in drawings, each device associated with the batch control instruction may display an operation state or a result of the operation. Although not shown, conversation partners indicating all devices may collectively display their states or results.

For example, for a result of a batch control instruction "Going out," each associated devices (i.e., an air conditioner, a robot cleaner, etc.) displays the results. That is, on the assumption that, when the instruction "Going out" is input, the air conditioner is set to be powered off, and the cleaner is set to perform a cleaning operation, the control device displays a conversation that the power is off on the conversation display window of the chatting screen together with the icon of the air conditioner displays a conversation that the cleaning operation is started together with the icon of the cleaner.

In addition, a conversation partner having a house shaped icon may collectively display the state or result (For example, "Going out mode has been executed," etc.).

Although not shown in FIG. 23, when the batch control instruction for a plurality of predefined devices is input to the conversation input window 620, the control device may also switch the conversation partner device to all devices and transmit individual control instructions associated with a batch control (that is, instructions to be performed by a corresponding device in association with the batch control instruction) or a batch control instruction itself to a plurality of electric devices associated with the batch control instruction. In addition, the control unit can transmit the batch control command to all electric devices in the home.

As shown in FIG. 24, when the batch control instruction is input to the conversation input window 620 while the icon for all devices is not selected on the icon selection window 630 of the chatting screen, the user interface unit automatically changes an electric device icon displayed in the icon selection window 630 to the icon for all devices and displays the icon for all devices.

For example, when a "Going out" instruction, which is a batch control instruction, is input while an icon of a robot cleaner is displayed in the icon selection window 630 of the chatting screen, the user interface unit displays the icon for all devices on the icon selection window 630 and displays the batch control instruction "Going out" on the conversation display window 610 in addition to the icon for all devices.

Furthermore, the control unit of the control device determines whether the going-out instruction input to the user interface unit is the batch control instruction.

Figure 25:
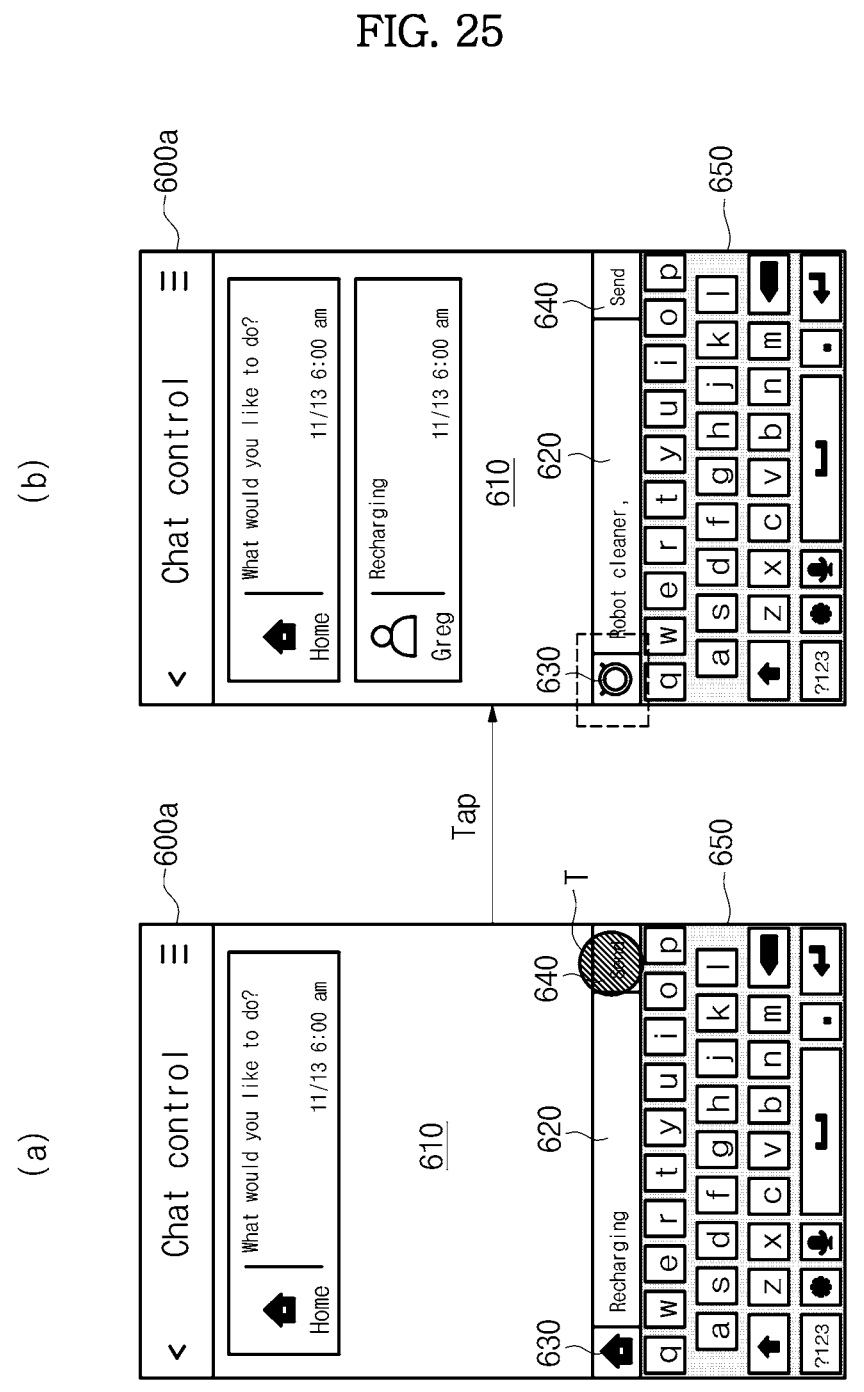
Figure 26:
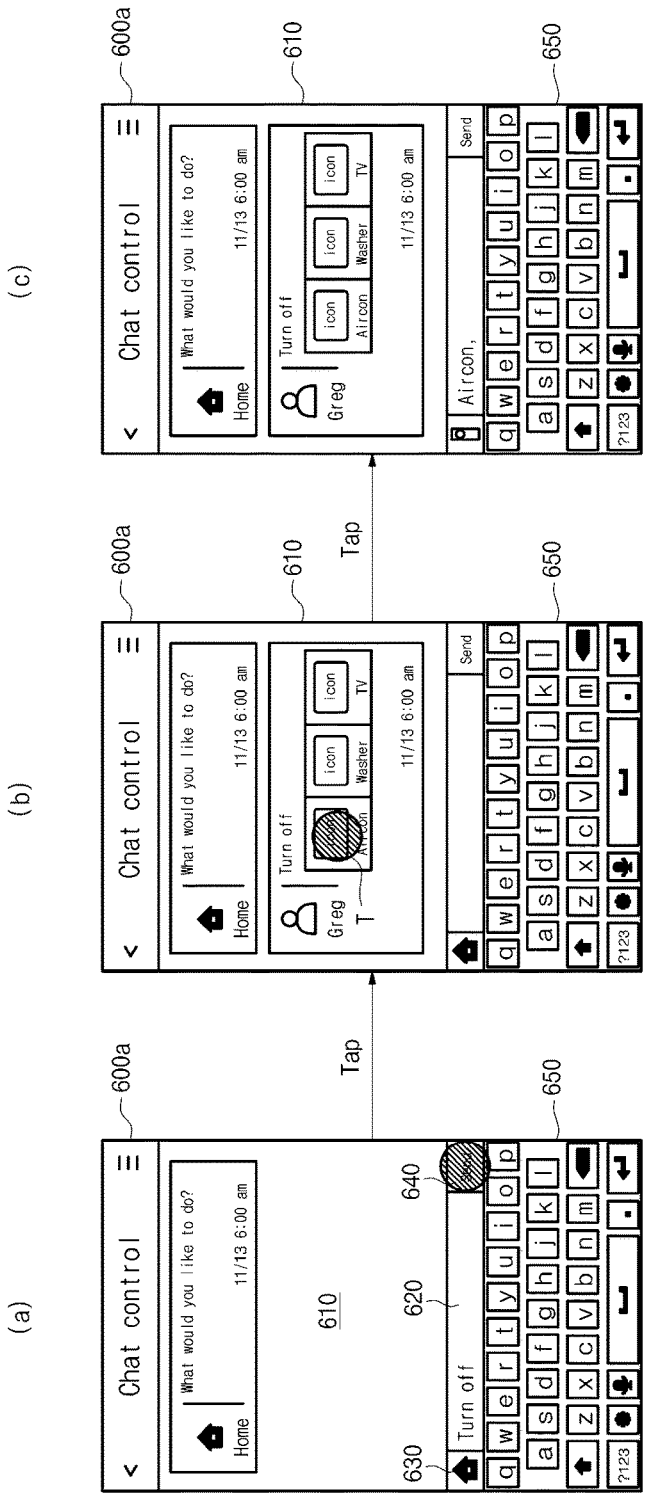
Figure 27:
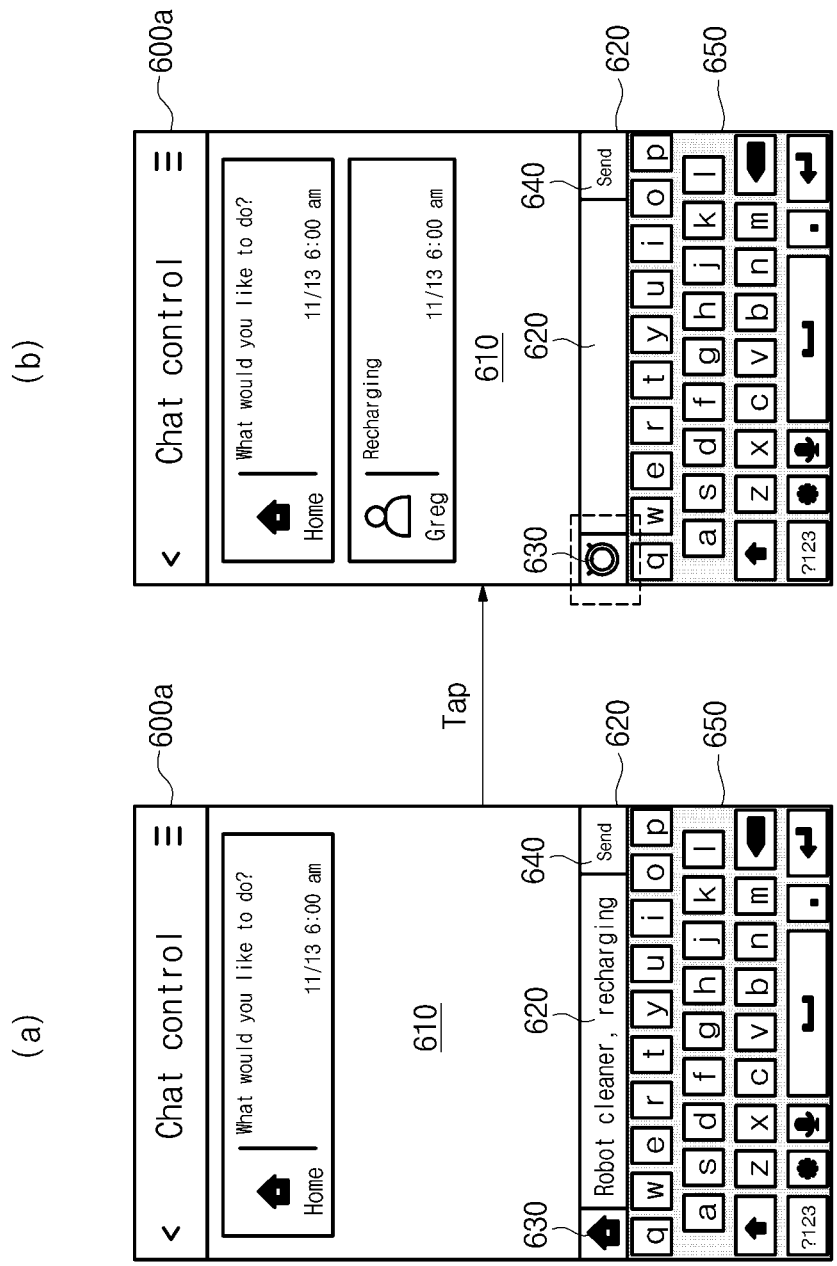

FIGS. 25, 26, and 27 are exemplary diagrams of a chatting screen that is used to individually control any one electric device.

As shown in FIG. 25, when the individual control instruction is input while the icon for all devices is displayed in the icon selection window 630 of the chatting screen, the user interface unit displays an icon of an electric device corresponding to the input individual control instruction on the icon selection window 630 and displays the input individual control instruction on the conversation display window 610.

In this case, the control unit of the control device determines whether the input instruction is the individual control instruction, checks an electric device having the determined individual control instruction, and transmits an operation command corresponding to the individual control instruction to the checked electric device, and displays information about an operation state of the checked electric device on the conversation display window 610 of the chatting screen of the user interface unit.

For example, when a "Recharging" instruction is input as the individual control instruction while an icon for all devices is displayed in the icon selection window 630 of the chatting screen, the user interface unit displays the icon of the robot cleaner on the icon selection window 630.

In this case, the control unit of the control device checks an electric device that performs recharging, which is the input instruction. When the checked electric device is determined as the robot cleaner, the control unit transmits a recharging command to the robot cleaner, receives information about a recharging operation from the robot cleaner, and displays the received information on the conversation display window 610 of the chatting screen of the user interface unit.

As shown in FIG. 26, when a message is input through the text window 650 while the icon for all devices is displayed in the icon selection window 630, the user interface unit displays the input message on the conversation input window 620. When a send button 640 is touched after the message displayed on the conversation input window 620 is input, the user interface unit displays the input message on the conversation display window 610.

The user interface unit displays at least one of a list of icons of a plurality of electric devices having the same instruction and a list of device names of the plurality of electric devices. When any one is touched from the list, the user interface unit displays, on the conversation input window 620, a device name of the electric device displayed in the touched region.

In addition, the user interface unit can display the icon list and the device names of the plurality of electric devices displayed on the conversation display window 610 and receive a device name of an electric device through the conversation input window 620.

That is, the control unit of the control device checks whether an instruction, that is, a message displayed on the conversation input window 620 is a duplicated instruction corresponding to the plurality of electric devices. When the instruction is determined to be duplicated, the control unit displays a list of icons of the plurality of electric devices associated with the duplicated instruction on the conversation display window 610 of the chatting screen of the user interface unit.

When at least one icon is selected from the list of icons of the plurality of electric devices displayed on the conversation display window 610 of the user interface unit, the control unit of the control device checks an electric device corresponding to the selected at least one icon and displays the device name of the checked electric device on the conversation input window 620.

Furthermore, the control device stores information about electric devices for each duplicated instruction and stores an operation command for each electric device.

For example, when a "Turn off" instruction is input as the duplicated instruction while an icon for all devices is displayed in the icon selection window 630 of the chatting screen, the user interface unit checks electric devices to which the "Turn off" instruction may be applied, that is, electric devices being turned on and displays a list of icons or device names of the checked electric devices.

The user interface unit receives a touch on an icon of at least one electric device from the list of icons of the electric devices or receives the device name through the conversation input window and transmits an "Turn off" operation command to the received electric device.

As shown in FIG. 27, when a name of a specific electric device (or a specific input for identifying an electric device) is input through the text window 650, the conversation state is changed to the corresponding electric device irrespective of the current conversation partner.

For example, the user interface unit checks whether the message displayed on the conversation input window 620 is the device name. When the checked message is determined to be the device name, the user interface unit checks an electric device having the determined device name and displays an icon of the checked electric device on the icon selection window 630.

When a message is input through the text window 650, the user interface unit displays the input message on the conversation input window 620. When a send button 640 is touched after the message displayed on the conversation input window 620 is input, the user interface unit displays the input message on the conversation display window 610, checks the input instruction on the conversation input window 620, and displays the checked "Recharging" instruction on the conversation display window 610.

For example, when "recharge robot cleaner" is input, the conversation partner is changed to the robot cleaner although previous conversation partners are all devices (a house shaped icon), a control command to recharge is transmitted to the robot cleaner. In addition, the conversation partner icon is changed to the robot cleaner.

The control unit of the control device transmits an operation command corresponding to the checked "Recharging" instruction to the robot cleaner, receives information about a recharging operation from the robot cleaner, and allows the received information to be displayed on the conversation display window 610 of the user interface unit.

An example of inputting an instruction of the chatting screen of the user interface unit will be described in detail with reference to FIGS. 28 to 33.

Figure 28:
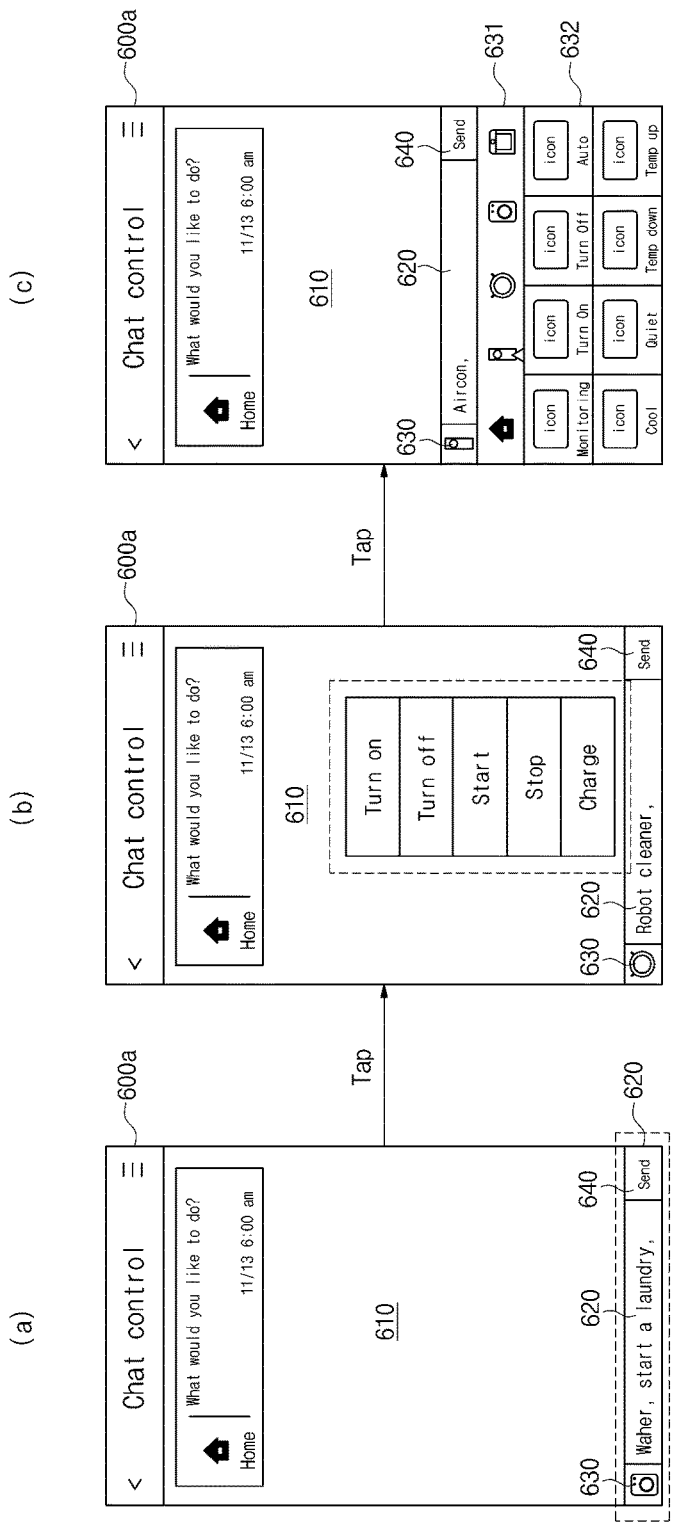
FIGS. 28 to 33 are exemplary diagrams showing an input of instructions to the chatting screen of the user interface unit provided in a control device according to another embodiment.

As shown in portion (a) of FIG. 28, the user interface unit directly receives natural language the user uses through the conversation input window of the chatting screen. As shown in portion (b), the user interface unit selects an instruction preset for each operation command and receives the selection through the conversation input window of the chatting screen. As shown in portion (c), the user interface unit displays an icon target window for each electric device and a shortcut word button window 632 for which an instruction for each electric device is set on the chatting screen and receives a touch on an icon and a button or receives an input through voice.

When the input is received through voice, the control device may display the recognized voice on the conversation window. In addition, when the input is received through voice, the control device may display a group of instruction candidates for the recognized voice and the group may be displayed such that the user selects an appropriate instruction from the group.

Figure 29:
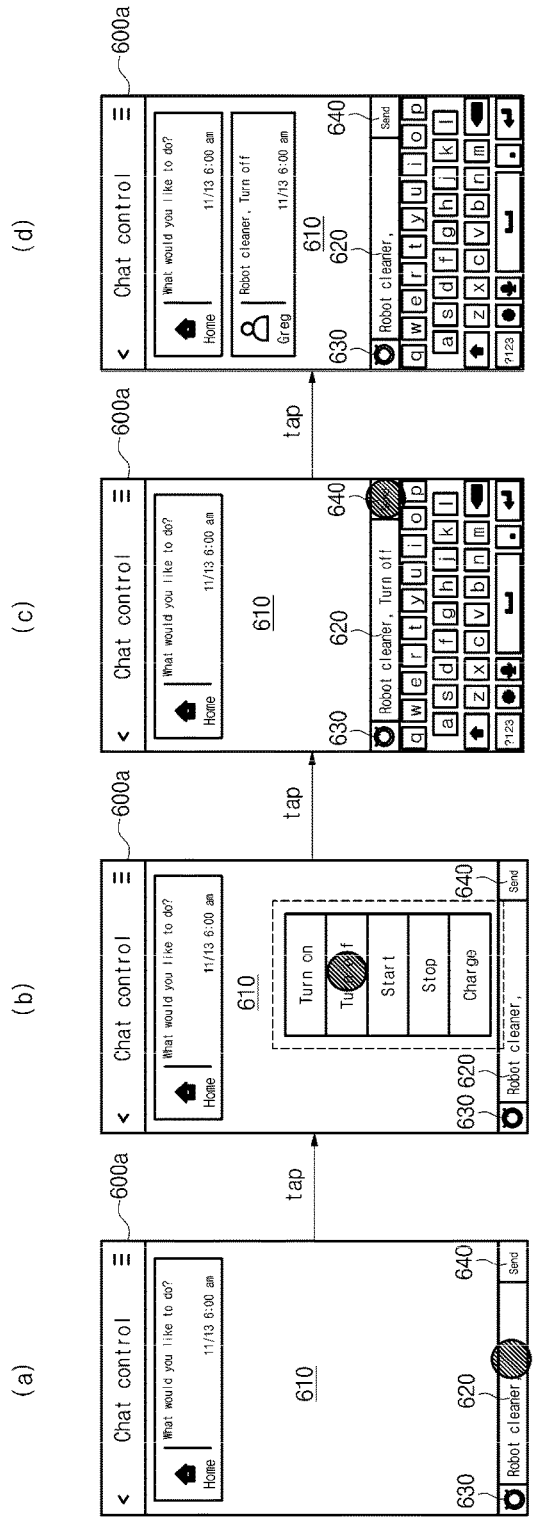

As shown in FIG. 29, when the message displayed on the conversation input window 620 is the device name, the user interface unit displays an icon of an electric device having the device name on the icon selection window 630. When the conversation input window 620 is touched in the manner of a tap or a long-tap, the user interface unit displays the preset instruction list. In this case, the instructions are set as a list for each electric device.

When any one instruction is touched from the preset instruction list, the user interface unit displays the touched instruction on the conversation input window 620. When the send button is touched by a user, the user interface unit displays a devices name and an instruction of an electric device that are input to the conversation display window 610.

The control unit of the control device checks whether the message displayed on the conversation input window 620 is the device name. When it is determined that the checked message is the device name, the control unit checks the electric device having the determined device name and displays an icon of the checked electric device in the icon selection window 630.

For example, when "Robot Cleaner" is input to the conversation input window 620, the user interface unit displays an icon of the robot cleaner on the icon selection window 630. When the conversation input window 620 is touched as a tap or long-tap, the user interface unit displays a preset instruction list for controlling the robot cleaner.

When Turn-off is touched from the preset instruction list, the user interface unit displays the touched instruction on the conversation input window 620. When the send button is touched, the user interface unit displays a conversation selected by the user on the conversation display window 610.

Figure 30:
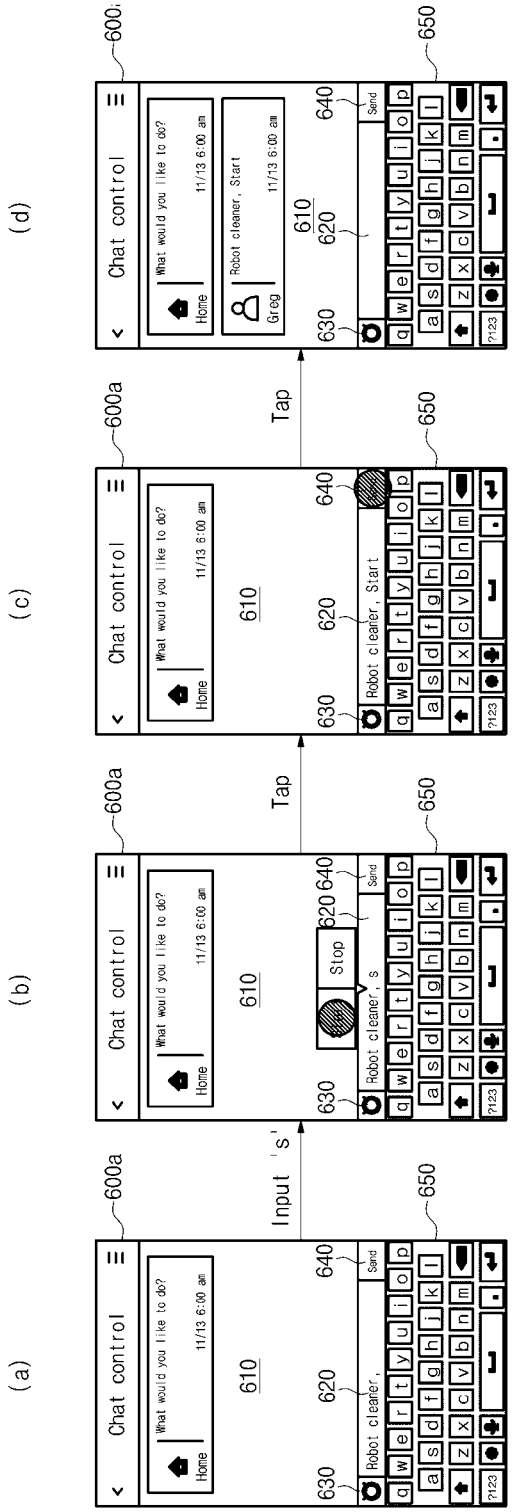

As shown in FIG. 30, when the message displayed on the conversation input window 620 is the device name, the user interface unit displays an icon of an electric device having the device name on the icon selection window 630 and displays a list of instructions that begin with at least one character input through the text window 650. That is, when the at least one character is input, the user interface unit displays an instruction based on an automatic completion function.

When any one instruction is selected from the instruction list, the user interface unit displays the selected instruction on the conversation input window 620. When the send button is touched, the user interface unit displays the device names and instructions on the conversation display window.

Furthermore, the control device stores an instruction and order information of words composing of the instruction.

For example, when "Robot Cleaner" is input through the text window 650, the user interface unit displays a robot cleaner on the conversation input window 620 and also displays an icon of the robot cleaner on the icon selection window 630. When "s" is input through the text window 650, the user interface unit displays a list of instructions that begin with "s."

When "start" is selected from among the instructions that begin with "s," the user interface unit displays "start" on the conversation input window 620. When the send button is touched, the user interface unit displays the device name (Robot Cleaner) and the instruction (start) on the conversation display window 610.

Figure 31:
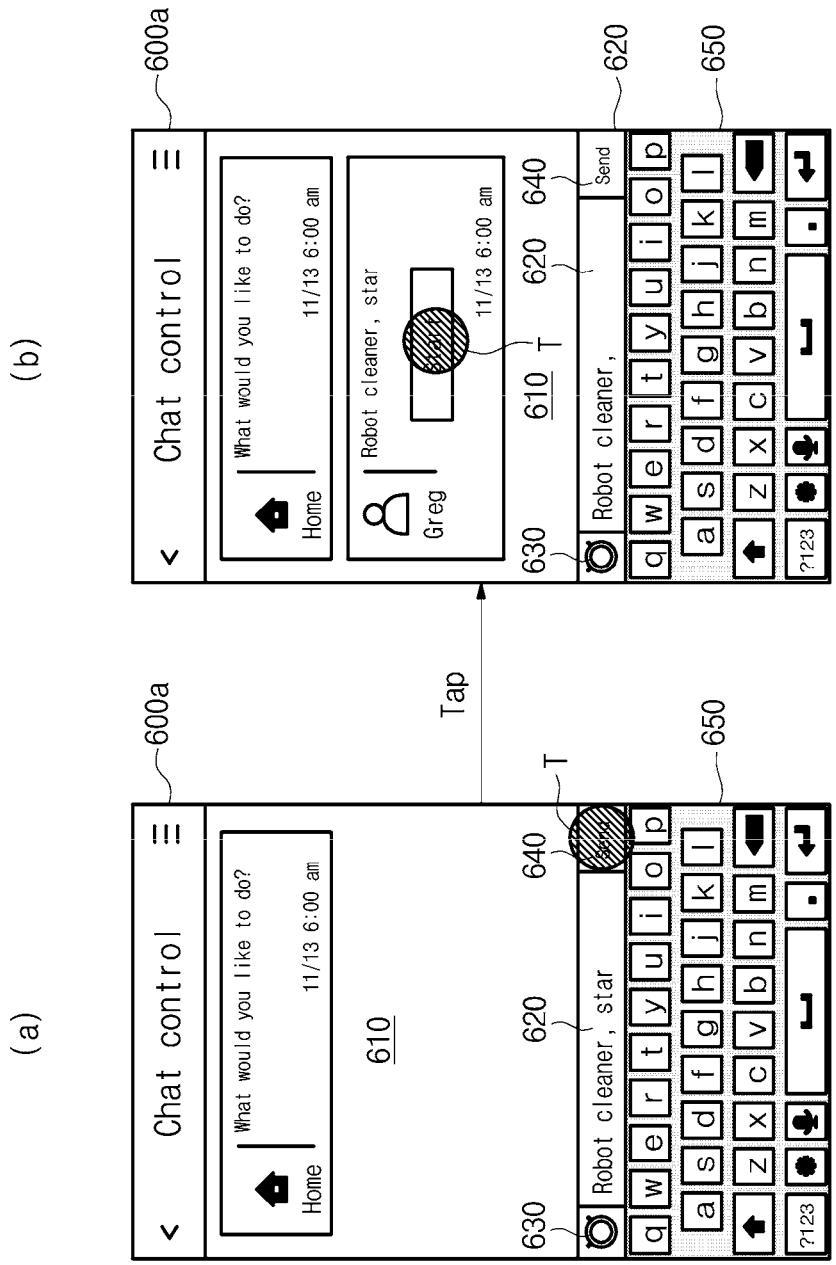

As shown in FIG. 31, when the message displayed on the conversation input window 620 is the device name, the user interface unit displays an icon of an electric device having the device name on the icon selection window 630 and displays an instruction input through the text window 650 on the conversation input window. When the send button is touched, the user interface unit displays the device name and the instruction on the conversation display window.

When the input instruction is an unrecognized instruction, the user interface unit displays an instruction that is most similar to the input instruction as a selectable button. When the displayed button is selected, the selected instruction is displayed again along with the device name.

In this case, the control unit of the control device determines a similarity of words between the input instruction and instructions of the electric device having the input device name, determines an instruction having a similarity equal to or greater than a certain value, and selects the determined instruction as a similar instruction.

For example, when "Robot Cleaner" is input through the text window 650, the user interface unit displays a robot cleaner on the conversation input window 620 and also displays an icon of the robot cleaner on the icon selection window 630. When "star" is input through the text window 650, the user interface unit displays "start," which is a command that is the most similar to "star."

That is, the control unit of the control device compares words composing of an instruction for controlling the robot cleaner with 'star' and determines "start," which is a command that is the most similar to "star," as the similar instruction.

Figure 32:
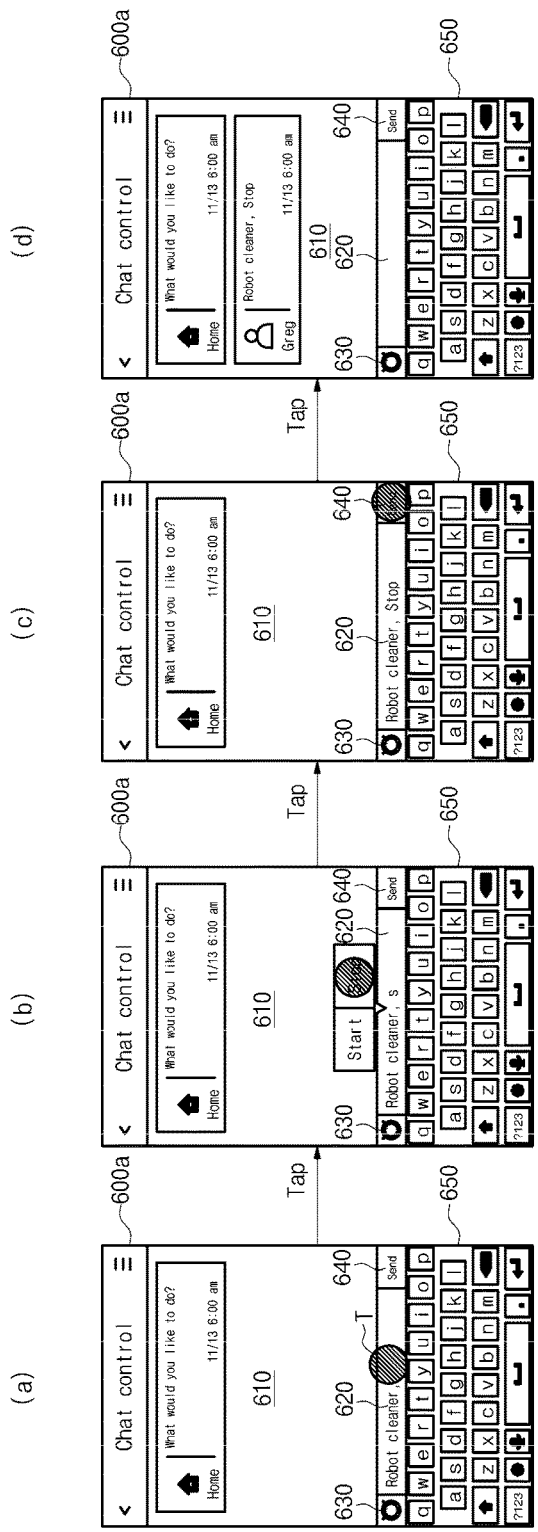

As shown in FIG. 32, when the message displayed on the conversation input window 620 is the device name, the user interface unit displays an icon of an electric device having the device name on the icon selection window 630 and displays, as a recommended instruction list, an instruction based on the operation state of the electric device having the device name. When any one instruction is selected from the recommended instruction list, and then the send button is touched, the user interface unit displays the device name and the instruction on the conversation display window 610.

In this case, the control unit of the control device checks the operation state of the electric device having the input device name, checks an executable operation command on the basis of the checked operation state, and checks an instruction corresponding to the checked operation command.

For example, when "Robot Cleaner" is input through the text window 650, the user interface unit displays a robot cleaner on the conversation input window 620 and also displays an icon of the robot cleaner on the icon selection window 630. The user interface unit displays a recommended instruction list on the basis of the operation state of the robot cleaner.

When an instruction "stop" is selected from the recommended instruction list, the user interface unit displays "stop" on the conversation input window. When the send button is touched, the user interface unit displays the device names and instructions on the conversation display window 610.

In this case, when the robot cleaner is determined to be in a charging operation, the control unit of the control device checks an executable operation, checks an instruction for controlling the checked operation, and displays a start instruction instructing to start cleaning and a stop instruction instructing to stop recharging in the recommended instruction list.

As another example, when the air conditioner is being stopped, the control unit may display an operation start command as the recommended instruction. When the air conditioner is in operation, the control unit may display an operation stop instruction, a target temperature up/down instruction, and an operation mode change instruction.

Figure 33:
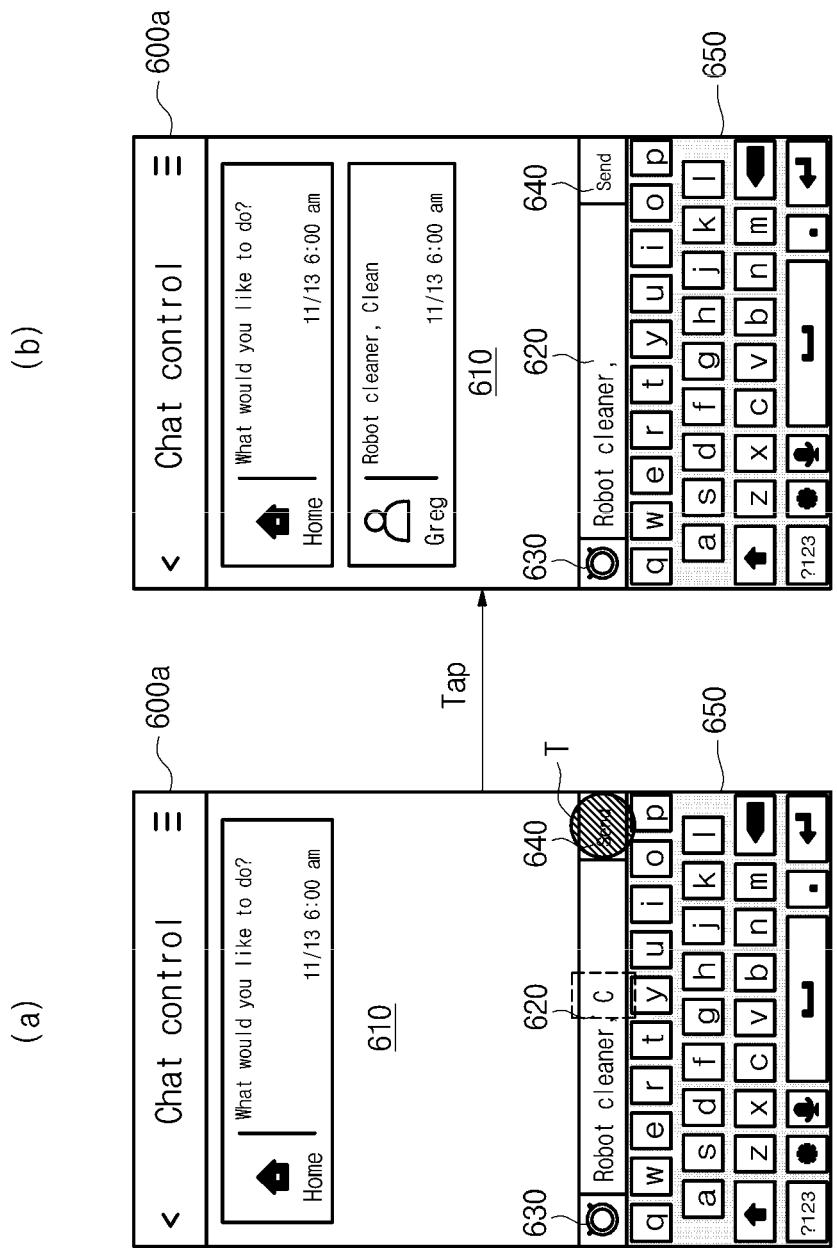

As shown in FIG. 33, when the message displayed on the conversation input window 620 is the device name, the user interface unit displays an icon of an electric device having the device name on the icon selection window 630. When a preset shortcut letter is input through the text window 650, the user interface unit displays the shortcut letter on the conversation input window. When the send button is touched, the user interface unit displays an instruction corresponding to the device name and the shortcut letter on the conversation display window 610.

In this case, the control device stores an instruction for each shortcut letter. In this case, the instruction for each shortcut letter may be set differently depending on the electric device.

That is, the control unit of the control device checks an instruction corresponding to the input shortcut letter and controls a display of the checked instruction.

For example, when "Robot Cleaner" is input through the text window 650, the user interface unit displays a robot cleaner on the conversation input window 620 and also displays an icon of the robot cleaner on the icon selection window 630. When "c" is input through the text window 650 and then the send button is touched, the user interface unit displays the instruction "clean" having the shortcut letter of "c" on the conversation display window 610 in addition to the device name (Robot Cleaner).

In this case, it is possible to easily chat with an electric device by inputting an instruction using the shortcut letter upon the chatting.

The invention claimed is:

1. A control device for controlling an operation of at least one electric device, the control device comprising:
   a display configured to display a user interface comprising:
   a chatting screen, the chatting screen comprising a conversation display window for displaying a conversation with the at least one electric device, a conversation input window for receiving a character for controlling an operation of the at least one electric device,
an icon selection window for displaying an icon corresponding to the at least one electric device, and
a send button for sending the character received through the conversation input window; and
at least one processor configured to:
check an electric device corresponding to a control instruction received through the conversation input window,
control to display an icon, and
send the control instruction to the electric device corresponding to the displayed icon.

2. The control device of claim 1, further comprising storage configured to store the control instruction,
wherein, the at least one processor is further configured to, when the control instruction is for simultaneously controlling two or more electric devices:
send the received character to the two or more electric devices, and
control to display an icon for all electric devices in the icon selection window.

3. The control device of claim 1, wherein, the at least one processor is further configured to, when the control instruction is received through the conversation input window while an icon for all electric devices is displayed in the icon selection window, control to send the received control instruction to a controllable electric device.

4. The control device of claim 1, further comprising storage configured to store the control instruction,
wherein, the at least one processor is further configured to, when the control instruction is for individually controlling any one electronic device:
check an electric device corresponding to the control instruction,
control an operation of the checked electric device corresponding to the control instruction, and
control to display an icon of the checked electric device in the icon selection window.

5. The control device of claim 4, wherein, the at least one processor is further configured to:
when two or more electric devices correspond to the control instruction for individually controlling any one electronic device, display a list of the two or more electric devices,
when any one is selected from among the two or more electric devices, control an operation of the selected electric device based on the control instruction, and
control to display information regarding the operation of the selected electric device in the conversation display window of the chatting screen.

6. The control device of claim 5, wherein the at least one processor is further configured to, when the two or more electric devices correspond to the control instruction for individually controlling any one electronic device, control to display an icon for all electric devices in the icon selection window.

7. The control device of claim 1, wherein the at least one processor is further configured to, when the character received through the conversation input window is a device name, control to display an icon of an electric device having the device name in the icon selection window.

8. The control device of claim 1, wherein the at least one processor is further configured to:
when the character received through the conversation input window is a shortcut letter, check an instruction corresponding to the shortcut letter and control an operation of an electronic device corresponding to the checked instruction,
when the character received through the conversation input window is not a shortcut letter, check an instruction having a similarity equal to or greater than a certain value with respect to the received character and control to display the checked instruction, and
when one character is received through the conversation input window, check an instruction having the received character as a first letter and control to display the checked instruction.

9. The control device of claim 1, wherein the at least one processor is further configured to:
check an operation state of the electric device corresponding to the displayed icon, and
control to display a list of executable recommended instructions based on the checked operation state.

10. The control device of claim 1, wherein the at least one processor is further configured to control to output a list of instructions for controlling the electric device corresponding to the displayed icon.

11. A control method of a control device that controls an operation of at least one of a plurality of electric devices, the control method comprising:
when a character is received through a conversation input window of a user interface unit, determining whether the received character is a control instruction;
when the received character is the control instruction, checking an electric device corresponding to the control instruction;
displaying an icon of the checked electric device in an icon selection window of the user interface unit; and
sending the control instruction to the checked electric device.

12. The control method of claim 11, further comprising:
when the control instruction is for individually controlling one electric device, checking an electric device corresponding to the control instruction and displaying an icon of the checked electric device in the icon selection window; and
when the control instruction is for simultaneously controlling two or more electric devices, displaying an icon for all electric devices in the icon selection window.

13. The control method of claim 12, further comprising:
when the two or more electric devices correspond to the control instruction for individually controlling one electronic device, performing control to display a list of the two or more electric devices;
when any one is selected from among the two or more electric devices, controlling an operation of the selected electric device based on the control instruction; and
displaying information regarding the operation of the selected electric device in the conversation display window of the user interface unit.

14. The control method of claim 11, further comprising, when the control instruction is received through the conversation input window while an icon for all electric devices is displayed in the icon selection window, sending the control instruction to the plurality of electric devices.

15. The control method of claim 11, further comprising:
when the character received through the conversation input window is a device name, displaying an icon of an electric device having the device name;
when the character received through the conversation input window is a shortcut letter, displaying an instruction corresponding to the shortcut letter;

when the character received through the conversation input window is not an instruction, checking an instruction having a similarity equal to or greater than a certain value with respect to the received character and displaying the checked instruction; and when one character is received through the conversation input window, checking an instruction having the received character as a first letter and displaying the checked instruction.

16. The control method of claim 11, further comprising:

checking an operation state of the electric device corresponding to the displayed icon; and displaying a list of executable recommended instructions based on the checked operation state.

* * * * *